（12）United States Patent
Shilane et al.

(10) Patent No.: US 11,768,807 B2
(45) Date of Patent: *Sep. 26, 2023

(54) DESTINATION NAMESPACE AND FILE COPYING

(71) Applicant: EMC IP Holding Company LLC, Hopkinton, MA (US)

(72) Inventors: Philip Shilane, Newtown, PA (US); Abhinav Duggal, Santa Clara, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/512,826

(22) Filed: Oct. 28, 2021

(65) Prior Publication Data

US 2023/0133361 A1 May 4, 2023

(51) Int. Cl.
G06F 16/00 (2019.01)
G06F 16/174 (2019.01)
G06F 16/22 (2019.01)
G06F 16/182 (2019.01)
G06F 16/14 (2019.01)

(52) U.S. Cl.
CPC ........ *G06F 16/1748* (2019.01); *G06F 16/152* (2019.01); *G06F 16/1844* (2019.01); *G06F 16/2246* (2019.01)

(58) Field of Classification Search
CPC ............... G06F 16/1748; G06F 16/152; G06F 16/1844; G06F 16/2246
See application file for complete search history.

(56) References Cited

U.S. PATENT DOCUMENTS

2020/0250149 A1* 8/2020 Bono .................... G06F 16/122

* cited by examiner

*Primary Examiner* — Tyler J Torgrimson
(74) *Attorney, Agent, or Firm* — Dergosits & Noah LLP; Todd A. Noah

(57) ABSTRACT

Destination namespace and file copying: a namespace service receives communication of namespace update for file from file's source. and communicates namespace update for file to an access object service identified for file. The access object service receives communication of fingerprints stream, corresponding to file's segments, from file's source, and identifies sequential fingerprints in fingerprints stream as fingerprints group. The access object service identifies group identifier for fingerprints group, and communicates fingerprints group to a deduplication service associated with group identifier range including group identifier. The deduplication service identifies fingerprints in fingerprints group which are missing from fingerprint storage, and communicates identified fingerprints to the access object service, which communicates request for file's segments, corresponding to identified fingerprints, to file's source. The deduplication service receives communication of requested segments from file's source, and stores requested segments. The access object service stores namespace update for file in distributed namespace data structure.

20 Claims, 10 Drawing Sheets

DESTINATION NAMESPACE AND FILE COPYING

TECHNICAL FIELD

This disclosure relates to storing digital information, and more particularly, to namespace and file copying.

BACKGROUND

A data user may copy data in a data center to one or more remote sites, which may be in one or more cloud locations, to have copies of data in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) file attachment, a data storage system may store all 100 instances of the same 1 MB file attachment, inefficiently using 100 MB of storage space to store the same 1 MB file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB file attachment and stores small references to the one stored instance for the 99 subsequent instances.

When being copied from or to a data storage system, a data file or a data object may be divided into data segments. A data deduplication system can receive data segments, compare these received data segments against previously stored data segments, identify which received data segments are unique because they have not been previously stored, and store the unique data segments. When a comparison identifies a received data segment as a duplicate of a data segment that has previously been stored as unique, a data deduplication system replaces the duplicate data segment with a small reference that points to the previously stored data segment.

Data deduplication efficiency depends on the number of duplications within data and how the data is divided for deduplication. For example, a relatively small data segment size enables a data deduplication system to identify more duplicates, and thereby save more recording media storage space. However, dividing a data file or a data object into a large number of small data segments increases the total size of the data segments' metadata because each data segment requires the same amount of metadata, increases the deduplication time required to process large numbers of small data segments, and increases data fragmentation.

In computer programing, a namespace can be a set of identifiers (known as names) that are used to refer to distinct types of objects while avoiding identifier collision between multiple objects that use the same identifier. Namespaces are commonly structured as hierarchies to allow reuse of identifiers in different contexts, which ensures that all of a given set of objects have unique identifiers so that each object can be easily identified. For example, within the namespace of a family named Smith, the given name John is sufficient to uniquely identify a person named John Smith even though people who have other family names may also have the given name John. Prominent examples for namespaces include file systems, which assign names to files, and hierarchical file systems which organize files in directories, so that each directory is a separate namespace, such that the directory "letters" and the directory "invoices" may both include a file named "to_jane". A namespace may be stored in distinct types of data structures.

A namespace's set of identifiers that are used to refer to distinct types of objects may include index nodes, which may be referred to as inodes. An inode can be a data structure in a Unix-style file system that describes a file-system object, such as a data file or a directory. Each inode stores the attributes and disk block locations of an object's data. File-system object attributes may include metadata, such as times of last change and access, as well as owner and permission data. A directory may be a list of inodes with their assigned names, with the list including an entry for itself, its parent, and each of its children.

A namespace may be stored in a B-tree, which can be a self-balancing computer data structure that maintains sorted data and allows searches, sequential access, insertions, and deletions in logarithmic time. The B-tree generalizes the binary search tree, allowing for nodes with more than two children. Unlike other self-balancing binary search trees, the B-tree is well suited for storage systems that read and write relatively large blocks of data, such as disks. The term B-tree may refer to a specific design or to a general class of designs. In the specific design sense, a B-tree stores keys in its internal nodes, but does not need to store those keys in the records at the leaves. A simple example of a B-tree 100 is depicted by FIG. 1A.

The general class of a B-tree includes variations such as the B+ tree, in which copies of the keys are stored in the internal nodes, the keys and records are stored in leaves, and a leaf node may include a pointer to the next leaf node to speed sequential access, as illustrated by the simple example of a B+ tree 102 depicted by FIG. 1B. The B+ tree 102 stores the namespace for employee files which are accessed using each employee's family name, which are the keys for accessing the files by employee name, and links the keys Allen–Patel to data values $d_{Allen}$–$d_{Patel}$, with the leaf nodes' links enabling rapid in-order traversal. A B+ tree can be viewed as a B-tree in which each node can have a large number of children and contain only keys (not key–value pairs), and to which an additional level is added at the bottom with linked leaves. The primary value of a B+ tree is in storing data for efficient retrieval in a block-oriented storage context, particularly file systems. This greater efficiency than binary search trees is primarily because B+ trees have high fanout, which is the number of pointers to child nodes in a node, typically about 100 or more, with the high fanout reducing the number of input/output (I/O) operations required to find an element in the tree.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1A:
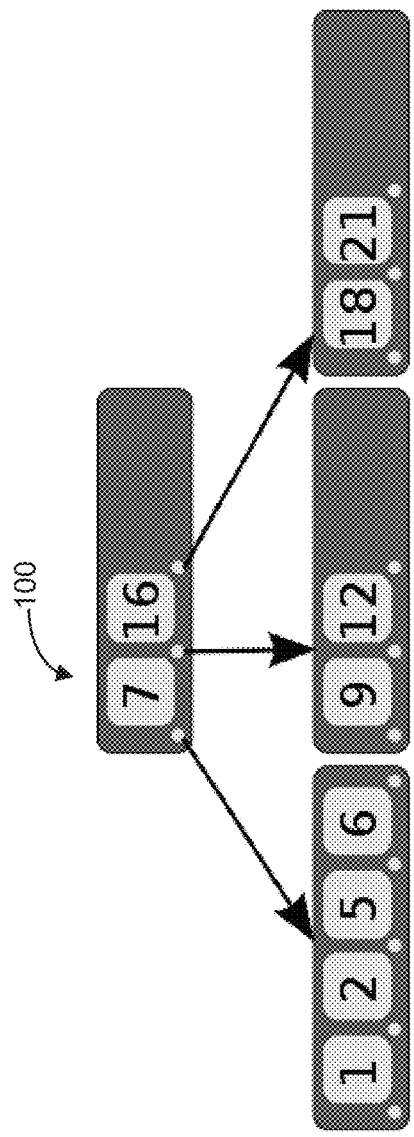
FIGS. 1A-B are block diagrams illustrating example data structures for namespace and file copying according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In some embodiments, a system (and a computer program product and a method) is described for destination namespace and file copying. A namespace service receives a communication of a namespace update for a file from a source of the file, and communicates the namespace update for the file to an access object service identified for the file. The access object service receives a communication of a stream of fingerprints, which correspond to segments of the file, from the source of the file, and identifies sequential fingerprints in the stream of fingerprints as a group of fingerprints. The access object service identifies a similarity group identifier for the group of fingerprints. The access object service communicates the group of fingerprints to a deduplication service which is associated with a range of similarity group identifiers that include the similarity group identifier.

The deduplication service identifies fingerprints in the group of fingerprints which are missing from fingerprint storage. The deduplication service communicates the identified fingerprints to the access object service. The access object service communicates a request for segments of the file, which correspond to the identified fingerprints, to the source of the file. The deduplication service receives a communication of the requested segments from by the source of the file, and then stores the requested segments. The access object service stores the namespace update for the file in a distributed namespace data structure.

For example, a namespace copying controller service receives an update for a Human Relations employees namespace, to rename an employee file named Greene as an employee file named Green, from the Human Relations system that manages the employee files, and communicates this namespace update for the file named Green to the access object service which processed the file named Greene. The access object service receives a communication of a stream of 20-byte SHA-1 hash fingerprints for segments in the file named Green being currently copied from a client, and then identifies an existing group of fingerprints numbered 1 to 509 which the client has already created from the stream of fingerprints for the file named Green. The access object service identifies an existing similarity group identifier of 483 which the client created for the group of fingerprints numbered 1 to 509 for the file named Green, and then uses the similarity group identifier of 483 to route the group of fingerprints numbered 1 to 509 to be deduplicated by the deduplication and compression service which deduplicates groups of fingerprints with similarity group identifiers in the range of 0 to 500. The deduplication and compression service identifies fingerprints numbered 2-7, 11-13, and 17-19, from the group of fingerprints numbered 1 to 509 for the file named Green, as fingerprints which are missing from a local fingerprint index.

The deduplication and compression service communicates the missing fingerprints numbered 2-7, 11-13, and 17-19 for the file named Green to the access object service, which requests the client to provide file segments numbered 2-7, 11-13, and 17-19, which correspond to the missing fingerprints numbered 2-7, 11-13, and 17-19. The deduplication and compression service receives a communication of the file segments numbered 2-7, 11-13, and 17-19 for the file named Green, compressed into compression regions, from the client, and then stores the compression regions into local storage. The access object service stores the namespace update for renaming the file previously named Greene in the Human Relations employees namespace which is stored in the access object service's key value store.

In some embodiments, such a system may be provided within an operating environment. An example of such an operating environment is further described herein with reference to FIG. 2A. However, in general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 2A:
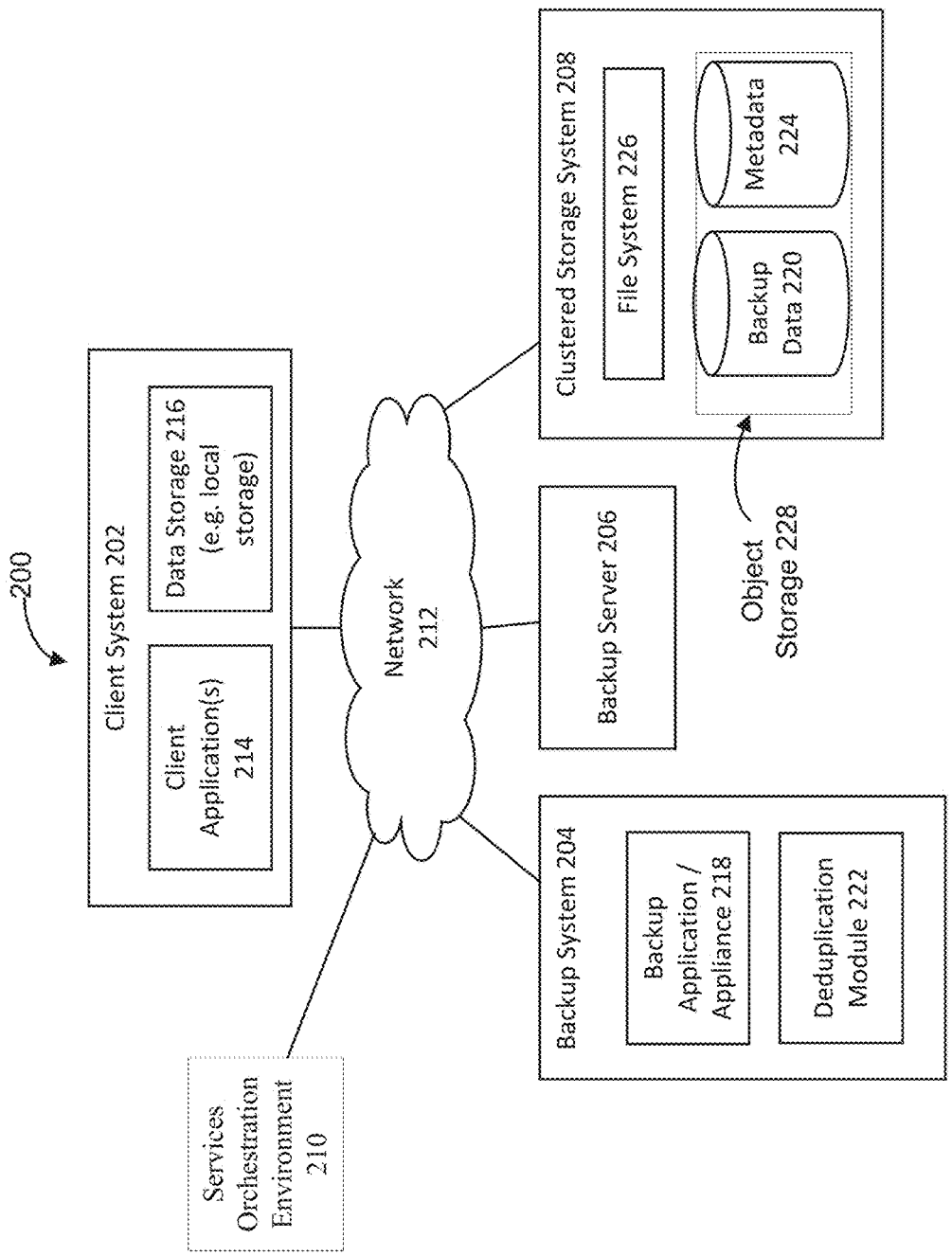
FIG. 2A is a block diagram illustrating an example operating environment for namespace and file copying according to one or more embodiments of the disclosure.

More specifically, and with reference to FIG. 2A, shown is a block diagram illustrating an example of an operating environment 200 for distributing phases of namespace and file copying within a clustered storage environment according to one or more embodiments of the disclosure. As shown, the operating environment 200 may include a client system 202, a backup system 204, a backup server 206, a clustered storage system 208, and a services orchestration environment 210, which may interact via a network 212, which may be any type of wired or wireless network including a local area network (LAN), a wide area network (WAN), or a direct communication link, or other suitable connection.

As shown, the operating environment 200 may include a client or client system (or computer, or device) 202 that may be associated with a client or customer of a data backup and protection service, and the backup system 204 that may be associated with a data backup and protection service provider. For example, the client system 202 may provide computing resources (such as databases) for users (such as website visitors) of the customer, and data which may be protected by the backup and data protection service provider. Accordingly, the client system 202 may function as a client from which backups are performed. In some embodiments, the client system 202 may comprise a virtual machine.

In addition, the client system 202 may host one or more client applications 214, and may include data storage 216, as well as an interface for communicating with other systems and devices, such as the backup system 204. In general, the client applications 214 may create new and/or modified data that is desired to be protected. As such, the client system 202 is an example of a host device. The data storage 216 may be used to store client data, which may, along with the client system 202 (such as the client applications 214), be backed up using the backup system 204.

As further described herein, components of the client system 202 (such as the client applications 214 and the data storage 216) may be a data source, or be associated with one or more data sources such as a database, a virtual machine, and a storage device. In addition, components of the client system 202 may be data sources that are associated with the client system 202, but these components may reside on separate servers, such as a data server, or a cloud-computing infrastructure. The client system 202 may include a backup client application, or plug-in application, or Application Programming Interface (API) that cooperates with the backup system 204 to create backups of client data. The backed-up data can also be restored to the client system 202.

In at least one embodiment, the backup system 204 may represent one or more components of a Data Domain Restorer-based deduplication storage system, and a backup server 206 may be implemented in conjunction with a Data Domain deduplication storage server provided by Dell EMC for use with Data Domain Restorer storage devices. For example, the backup server 206 may be a stand-alone entity, or may be an element of the clustered storage system 208. In some embodiments, the backup server 206 may be a Dell EMC Avamar server or a Dell EMC Networker server, although no particular server is required, and other backup and storage system configurations are contemplated.

The backup system 204 may include a backup application (or appliance) 218 that performs, manages, or coordinates the creation and restoration of data that may be backed-up. For example, data to be backed-up from the client system 202 may be communicated from the client system 202 to the backup application 218 for initial processing, after which the processed data, such as backup data 220, is uploaded from the backup application 218 for storage at the clustered storage system 208. In some embodiments, the backup application 218 may cooperate with a backup client application of the client system 202 to back up client data to the clustered storage system 208. The backup application 218 may also cooperate with a backup client application to restore backup data from the clustered storage system 208 to the client system 202.

In some embodiments, the backup application 218 may be a part of, or work in conjunction with, a storage appliance. For example, the storage appliance may include a Dell EMC Cloud Boost appliance, although any suitable appliance is contemplated. In addition, the backup application 218 may provide a variety of useful functionalities such as source-side data deduplication, data compression, and WAN optimization boost performance and throughput, while also possibly reducing the consumption and cost of network bandwidth and cloud storage capacity.

One, some, or all, of these functions of the backup application 218 may be performed using deduplication logic via a deduplication module 222. For example, the deduplication module 222 can provide data segmentation, as well as in-flight encryption as the data is sent by the backup application 218 to the clustered storage system 208. However, as further described herein, in some embodiments, data deduplication may be performed entirely within the clustered storage environment 208. It should be noted that the backup application (or storage appliance) 218 may be implemented in various forms, such as a virtual, physical, or native public cloud appliance to fit the requirements of a particular configuration, and the backup application 218 may be used with distinct types of data protection environments, including public and private object storage clouds.

The clustered storage system 208, as further described herein, may store backup data 220 (backup files or backup objects) within a one or more nodes, as further described herein. As shown, the clustered storage system 208 may also store metadata 224 for (or associated with) the backup data 220, and one or more instances of a filesystem 226 that catalogs backup files and other data residing in the clustered environment. In general, the storage of the backup data 220 may be configured to store data backups for the client system 202, which may be restored in the event of a loss of data. The clustered storage system 208 may be a file storage system or an object storage system that includes file storage 228 or object storage 228, as further described herein.

Figure 2B:
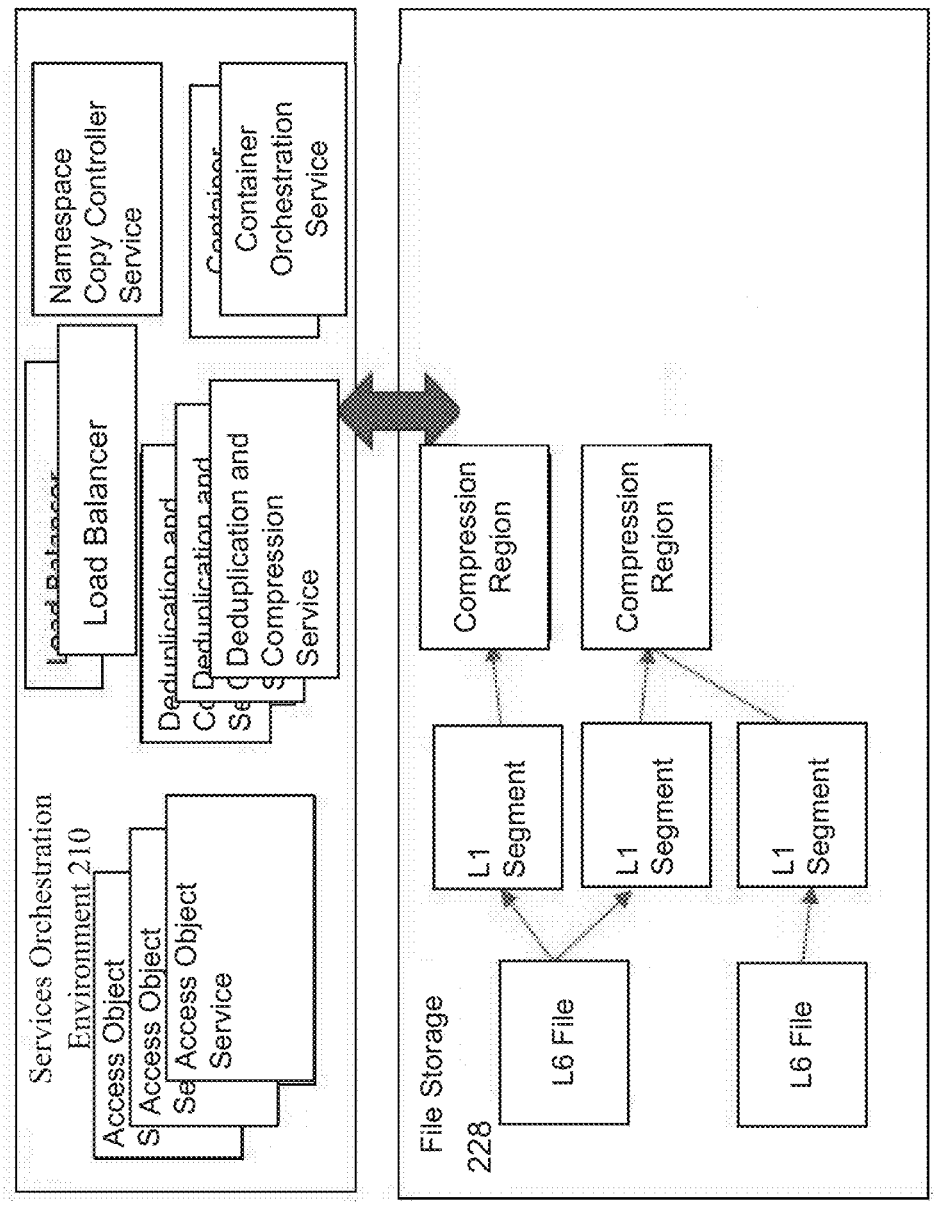
FIG. 2B is a block diagram illustrating parts of an example operating environment for namespace and file copying according to one or more embodiments of the disclosure.

As shown in FIG. 2B, the services orchestration environment 210 (such as a Kubernetes cloud computing environment) may provide for the deployment of distinct types of services. The services orchestration environment 210 may enable the deployment of services for namespace and file copying and for conditional storage in the file storage 228 or the object storage 228.

L6 Files or Objects, L1 Segments, & L0 Compression Regions

In various embodiments, when a client copies a data object or data file to a destination, the data object or data file may be divided into data segments. A deduplication system typically does not determine whether any such data segment is a duplicate data segment or a unique data segment by directly comparing this data segment against previously stored data segments which were previously determined to be unique data segments. For example, a deduplication system would waste system resources by directly comparing thousands of bytes in each of many data segments which were formed from a client's data object or data file against thousands of bytes in millions of data segments which have already been identified and stored as unique data segments. Instead, a fingerprint that uniquely identifies a data segment may be generated for each data segment, such as by applying a SHA-1 hash function to create a unique 20-byte fingerprint for each data segment. Consequently, a deduplication system can conserve system resources by more efficiently comparing 20-byte fingerprints for each of many data segments formed from a client's data object or data file against 20-byte fingerprints for millions of data segments which have already been identified and stored as unique data segments.

If a client generates fingerprints for its data segments, the client can communicate these fingerprints, instead of its data segments, to a front-end service for a deduplication system. However, if a client does not generate fingerprints for its data segments, the client communicates the data segments to a front-end service. If a front-end service receives a communication of fingerprints for data segments from a client, the front-end service communicates these fingerprints to a back-end service for deduplication. However, if a front-end service receives a communication of data segments instead of their fingerprints from a client, the front-end service may communicate the data segments to a back-end service for deduplication, or the front-end service may generate the fingerprints for the data segments, and then communicate these fingerprints to the back-end service.

If a back-end service receives a communication of fingerprints for data segments, the back-end service uses the fingerprints for deduplication of the data segments. However, if a back-end service receives a communication of data segments instead of the data segments' fingerprints, the back-end service generates the fingerprints for the data segments and then uses the fingerprints for deduplication of the data segments. An advantage of a client or a front-end service generating fingerprints for data segments, such that a back-end service does not have to generate these fingerprints, is a significant reduction in communication volume and time. For example, if a client or a front-end service generates a 20-byte SHA-1 hash fingerprint for a typical 8,000-byte data segment, the amount of bytes that the client or the front-end service has to communicate for the content of this typical data segment is reduced by 99.75%, from 8,000 bytes to 20 bytes. Consequently, since a client that generates fingerprints for data segments can significantly reduce the amount of bytes communicated to a front-end service and to a back-end service, embodiments of the disclosure copy files by configuring sources to generate fingerprints for the file segments to be copied to a destination, and to communicate these fingerprints to the destination.

Whether a back-end service receives a communication of fingerprints for data segments or generates the fingerprints for the received data segments, the back-end service compares these newly received fingerprints against previously generated fingerprints for previously stored data segments that were previously identified as unique. These comparisons determine which of the newly received fingerprints are unique, and therefore were generated for data segments which are unique, and which of the newly received fingerprints are duplicates, and therefore were generated for data segments which are duplicates. Upon the identification of unique fingerprints generated for the data segments that are unique, the back-end service can communicate this identification of unique data segments to a front-end service, which can communicate this identification of unique data segments to a client. Then the unique data segments may be stored in a compressed format in a compression region by a client, a front-end service, or a back-end service, whichever entity currently retains the data segments which were just identified as unique segments.

Figure 3:
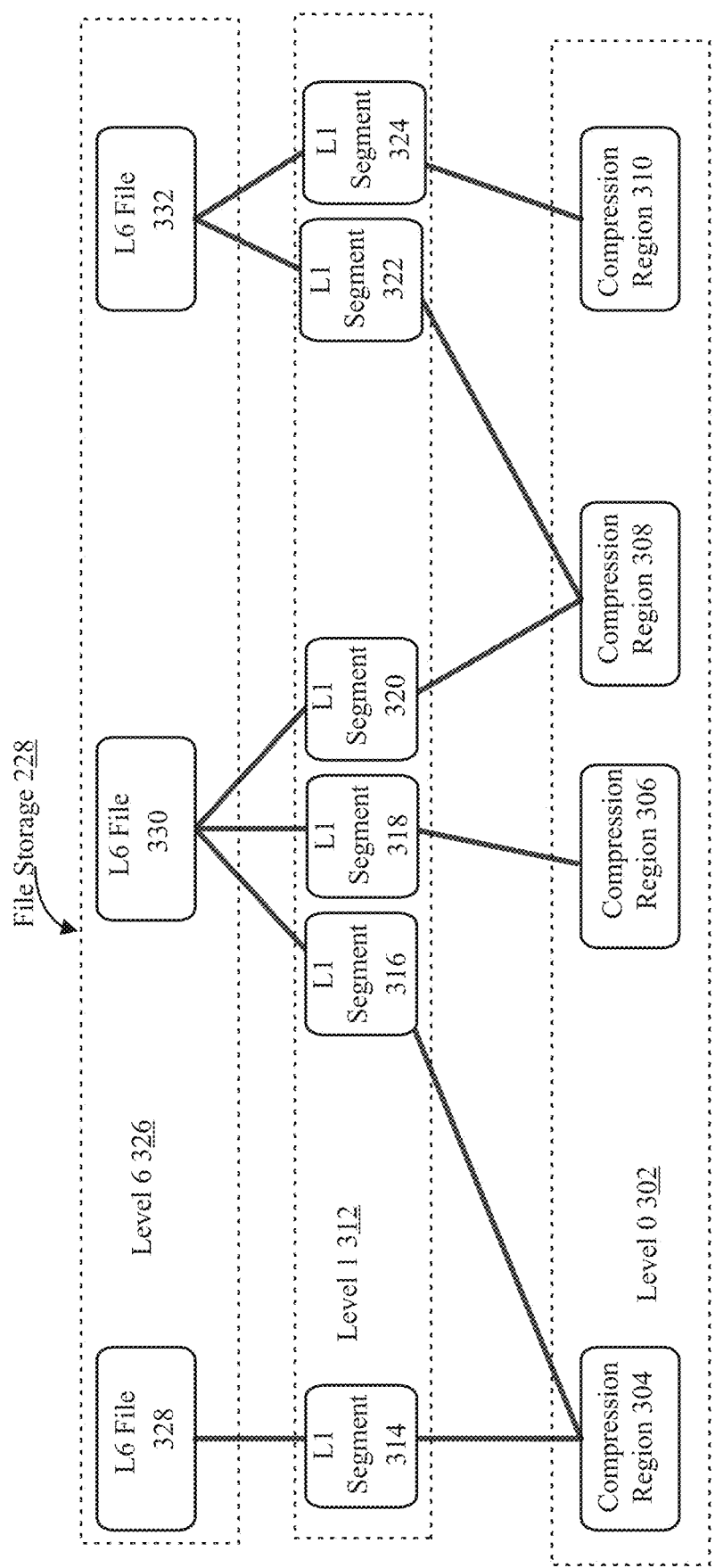
FIG. 3 is a block diagram illustrating relationships between L6 files or objects, L1 segments, and L0 compression regions for namespace and file copying according to one or more embodiments of the disclosure.

FIG. 3 depicts that a portion of the file storage 228 or the object storage 228 may be represented by Level 0 302, which may include compression regions 304-310. Each compression region may store unique data segments that have been compressed and each compressed data segment's corresponding unique fingerprint and data segment size.

A data file or data object may be represented by a Merkle tree with the bottom level of the Merkle tree representing the data segments, which may be referred to as level 0 data segments or L0 data segments. Large numbers of sequential fingerprints, such as 20-byte SHA-1 hash fingerprints, generated for sequential data segments, may be grouped together at the next higher level of the Merkle tree to form groups of fingerprints for data segments, which may be referred to as a level 1 segment or a L1 segment. The fingerprints of the groups of data segments that form L1 segments may be grouped together as a level 2 fingerprints for data segment or a L2 segment, and this process of grouping fingerprints for increasingly larger groups of data segments may continue up to level 6 or L6, which represents the entire data file or data object.

The top of a Merkle tree is referred to as an L6 file or object, even though it may actually refer to fingerprints for groups of data segments in a lower numbered level. Fingerprints for segments which are above L0 may be referred to as LP segments. While multiple L0 data segments may be compressed into 64-kilobyte (KB) to 128 KB sized compression regions, LP segments are not compressed because fingerprints, such as 20-byte SHA-1 hash fingerprints, are quite random and do not compress well.

Since either a sequence of a file's data segments or a sequence of the data segments' fingerprints may be used for forming a L1 segment and/or determining a similarity group identifier, a source can communicate these fingerprints without communicating these data segments when L1 segments are to be formed and similarity group identifiers are to be determined. A similarity group identifier may be used to route a L1 segment to a back-end service that is uniquely responsible for each L1 segment which has a similarity group identifier that is within a range of similarity group identifiers.

FIG. 3 depicts that a portion of the file storage 228 or the object storage 228 may be represented by Level 1 312, which may include L1 segments 314-324. Each L1 segment may store metadata that identifies the data object or data file to which a particular L1 segment belongs, a reference to a similarity group identifier, and a fingerprint array that stores those fingerprints included in a L1 segment and the sizes of each data segment represented by each fingerprint. FIG. 3 depicts that a portion of the file storage 228 or the object storage 228 may be represented by Level 6 326, which may include L6 files 328-332. Each data file or data object has a corresponding L6 file or object, which may reference the one or more L1 segments associated with the data object or data file, since the associated L1 segments are based on an array of fingerprints of the data segments which comprise the data object or data file.

Deduplication happens when different data files or data objects refer to the same L0 data segments and LP segments. For example, if two data files are exactly the same, they would have the same L6 fingerprints. However, if two data files only partially overlap in their data, then some branches of the Merkle tree will be identical, with the same LP fingerprints and the same L0 data segments, while other branches of the Merkle tree will be different, with different LP fingerprints and different L0 data segments.

For a system with a single node, a L1 segment may be formed based on fixed offsets within data objects or data files, regardless of data segment boundaries. Since L1 segments are all processed within a single back-end node, such a formation may have insignificant impact on overall deduplication ratios, despite the partial data segments which may occur at the ends and the beginnings of the groups of data segments that form L1 segments. For a system with multiple back-end nodes, a L1 segment may be formed by evaluating a feature value (such as a hash of the first 64 bytes) of each data segment for forming the L1 segment until the feature value of one of the data segments satisfies criteria for forming a group of data segments, such as by the first data segment which has a feature value that matches a bit pattern mask. For example, a data segment which has the feature value that matches the bit pattern mask will serve as a boundary between where the data segments end for forming the current L1 segment and the data segments begin for forming the next L1 segment, which typically results in the L1 segments storing fingerprints for groups of data segments that range from 0.5 MB to 2.0 MB.

Then a feature value for a data segment for forming a L1 segment (such as a hash of the first 64 bytes of the first data segment for forming a L1 segment) may be used as the basis for determining a similarity group identifier to route the L1 segment to the appropriate back-end service. Using a hash of a representative portion of a data segment can result in L1 segments for data that are similar, but not identical, being routed to the same back-end service. The net effect of such routing may be to improve deduplication while increasing skew. Using a feature value for the first data segment for forming a L1 segment has the advantage that it is not necessary to buffer all data segments for forming a group of data segments that form a L1 segment before deciding where to route the L1 segment, something that matters when hundreds or thousands of data segments are being processed simultaneously. Collisions are acceptable when using a hash function for routing L1 segments rather than using a hash function for deduplication, so a system can base a similarity group identifier on the first 32-bit word of a 20-byte SHA-1 hash for the first 64 bytes in the first data segment in a group of data segments that form a L1 segment.

Figure 4:
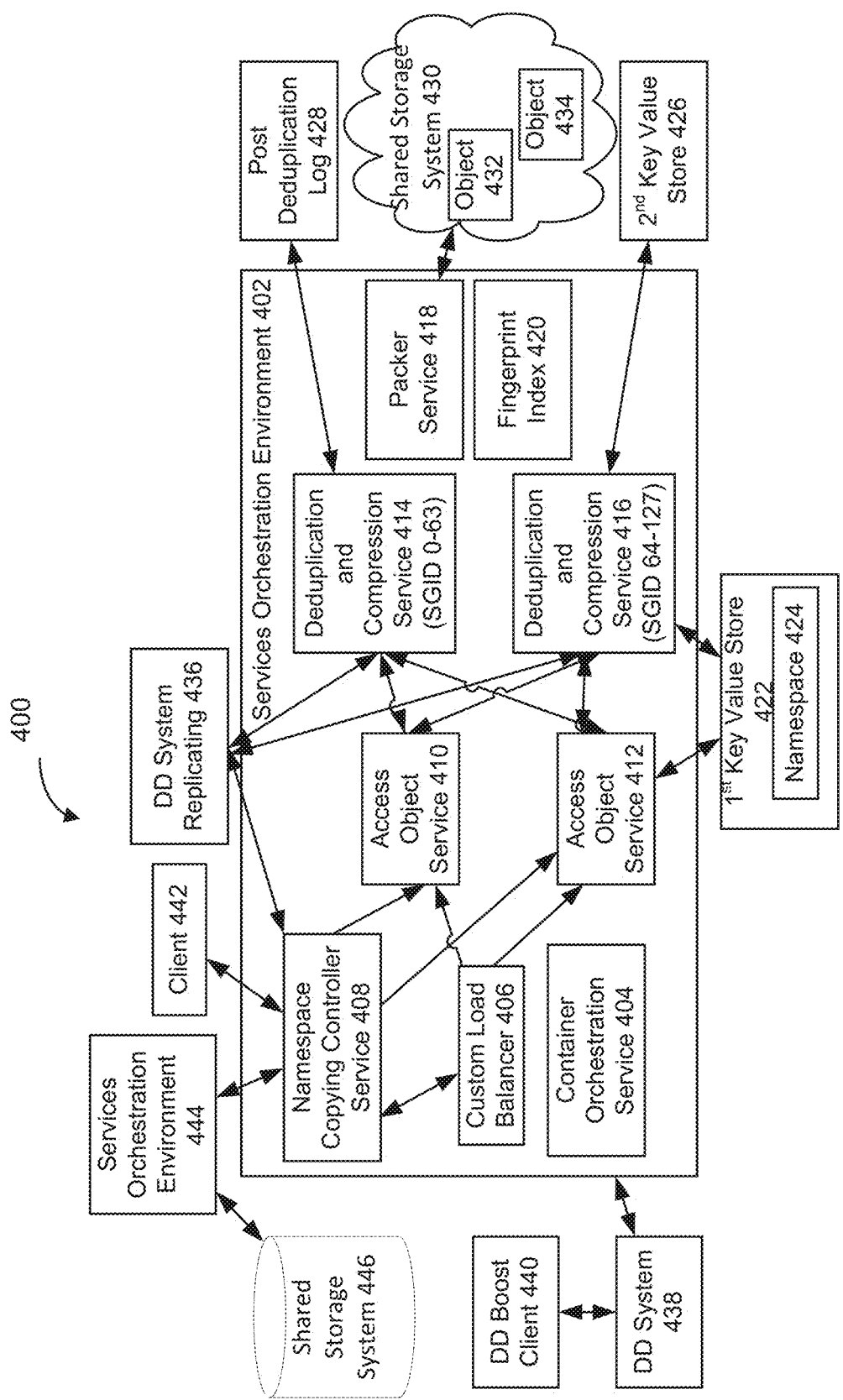
FIG. 4 is a block diagram illustrating a system for namespace and file copying according to one or more embodiments of the disclosure.

A simplified diagram of the architecture for the system 400 is depicted in FIG. 4. A services orchestration environment 402 may be implemented on one or multiple physical or virtual nodes, either on premises with dedicated hardware or in a public cloud environment. A container orchestration service 404, such as Kubernetes, may execute services or micro-services inside the services orchestration environment 402 as containers.

The services orchestration environment 402 may include a custom load balancer service or micro-service 406, a namespace copying controller service or micro-service 408, which may be referred to as a namespace service and which may be a standalone service or integrated into other existing services, access object services or micro-services 410 and 412, deduplication and compression services or micro-services 414 and 416, a packer service or micro-service 418, and a fingerprint index 420. FIG. 4 depicts the services orchestration environment 402 with one custom load balancer service 406, one namespace copying controller service 408, two access object services 410 and 412, two deduplication and compression services 414 and 416, one packer service 418, and one fingerprint index 420. However, the services orchestration environment 402 may include any number of custom load balancer services 406, any number of the access object services 410 and 412, any number of the deduplication and compression services 414 and 416, any number of the packer service 418, and any number of the fingerprint index 420. Each of the deduplication and compression services 414 and 416 include a deduplication service and a compression service.

The services orchestration environment 402 may communicate with a first key value store 422 that stores a namespace 424, a second key value store 426, a post deduplication log 428, a shared storage system 430 that stores objects 432 and 434, a Data Domain system replicating 436, a Data Domain system 438 that communicates with a Data Domain Boost client 440, a client 442, and another services orchestration environment 444 that communicates with another shared storage system 446. FIG. 4 depicts the system 400 as including two services orchestration environments 402 and 444, two key value stores 422 and 426, one post deduplication log 428, two shared storage systems 430 and 446, two objects 432 and 434, one Data Domain system replicating 436, one Data Domain system 438, one Data Domain Boost client 440, and one client 442. However, the system 400 may include any number of services orchestration environments 402 and 444, any number of key value stores 422 and 426, any number of post deduplication log 428, any number of shared storage systems 430 and 446, any number of objects 432 and 434, any number of Data Domain system replicating 436, any number of Data Domain systems 438, any number of Data Domain Boost clients 440, and any number of client 442. The services orchestration environment 402 and its associated components 404-434 may be referred to as a source services orchestration environment 402 and source components 404-434 while operating as the source of a namespace and/or files being copied to a destination, or referred to as a destination services orchestration environment 402 and destination components 404-434 while operating as the destination of a namespace and/or files being copied from a source, The key value store 422 can store the namespace 424 in a B-tree, which may be a distributed key value stores that stores much of the metadata for the system 400, such as the LP tree and a short fingerprint index. The key value stores 433 and 426 can run as containers within the cluster of nodes and may be stored to low latency media, such as flash.

When copying a file from the source Data Domain Boost client 440 to the destination Data Domain system 438, the source Data Domain Boost client 440 communicates all the L1 fingerprints for the file's segments necessary to recreate the file at the destination Data Domain system 438, and the destination Data Domain system 438 uses all the currently received L1 fingerprints to form the upper LP segments for the file. The destination Data Domain system 438 compares all the newly received L1 fingerprints to its previously stored fingerprints, identifies the newly received L1 fingerprints which are missing from its previously stored fingerprints at the destination, and returns identifications of the missing fingerprints to the source Data Domain Boost client 440. The source Data Domain Boost client 440 receives the identifications of the missing fingerprints from the destination Data Domain system 438, retrieves the file's L0 data segments that correspond to the missing fingerprints, and communicates the missing L0 data segments to the destination Data Domain system 438 which stores the missing L0 data segments needed to copy the file from the source Data Domain Boost client 440 to the destination Data Domain system 438.

Copying a File to a Destination Services Orchestration Environment

The Data Domain system 438 or the services orchestration environment 444 can be the source of a file to be copied, and can communicate the fingerprints for the file's L0 data segments to the destination services orchestration environment 402 through the destination custom load balancer 406 in front of the destination access object services 410 and 412. Based on a hash of the file handle or other information for the file being copied, the destination custom load balancer 406 can route the copy traffic to one of the destination access object services 410 or 412, in a consistent manner so that future writes and/or reads of the same file would be routed consistently to the same destination access object service 410 or 412. This consistent routing by the destination custom load balancer 406 can enable the destination access object services 410 and 412 to cache state in memory that may be reused for recesses and avoids expensive locking. The destination access object services 410 and 412 can use the fingerprints for the file's L0 data segments to form a LP Merkle tree and update the directory manager for the tree.

Copying a Namespace and its Files to a Destination Services Orchestration Environment A source of a namespace (and its files) can copy the namespace to a destination of the namespace by taking periodic point-in-time (PiT) images $PiT_0$, $PiT_1$, $PiT_2$ ... in the source at times $T_0$, $T_1$, $T_2$ ... and propagating any differences in the point-in-time images from the source to the destination so that the destination can create new point-in-time images. For example, at time $T_0$, a point-in-time image $PiT_0$ of a B+ tree for a namespace exists in both the source and the destination, and then at time $T_1$ the source creates a new point-in-time image $PiT_1$ of the B+ tree for the source's namespace, so the destination creates a new copy of the B+ tree for the destination's namespace from the destination's point-in-time image $PiT_0$, and uses this new copy as the basis for the prospective B+ tree for the destination's namespace for time $T_1$. The source calculates a relative differential between the previous point-in-time image $PiT_0$ and the new point-in-time image $PiT_1$, and if the source determines that the relative differential indicates that a file in the new point-in-time image $PiT_1$ is the same as the corresponding file in the previous point-in-time image $PiT_0$, then the source instructs the destination to skip any update for this file in the destination. However, if the source evaluates the relative differential and identifies any differences between a file in the new point-in-time image $PiT_1$ and the corresponding file in the previous point-in-time image $PiT_0$, then the source propagates these differences to the destination, which updates the destination's prospective B+ tree for the destination's namespace for time $T_1$, which points to the new content handle for the file. The source continues this process of evaluating the relative differential for each file and propagating the differences to the destination, through the last file in the source's B+ tree for the source's namespace. After the differences for all the files and the namespace entries of the new point-in-time image $PiT_1$ are propagated to the destination and verified, the destination exposes the destination's updated prospective B+ tree for the destination's namespace for time $T_1$ to the destination's clients, which had been accessing the B+ tree for the destination's previous namespace for time $T_0$.

The goal of namespace and file copying is to synchronize the namespace and content in the destination with the namespace and content in the source. The copying technique can calculate differentials at the logical level relative to what has already been transferred. For example, the Data Domain system 438 or the services orchestration environment 444 can be a source of a namespace to be copied, and can take a snapshot of a source namespace and then calculate a differential relative to the previous snapshot of the source namespace. The calculated differentials of these snapshots are processed as namespace updates, which can include file additions, deletions, and modifications, as well as changes to folder structures and attributes. Then the source of the namespace can communicate the namespace update to the destination services orchestration environment 402, which can maintain the namespace in a distributed manner across a cluster of nodes instead of within a single node.

In contrast to traditionally updating a namespace managed by a single node, the destination namespace copying controller service 408 can update a namespace distributed across multiple nodes within a cluster of nodes. The destination namespace copying controller service 408 can receive a communication of a namespace update for a file from a source of the file, and then communicate with other services. For example, the destination namespace copying controller service 408 receives an update for a Human Relations employees namespace, which is to rename an employee file named Greene as an employee file named Green, from the Human Relations system that manages the employee files.

Since a namespace may be distributed across multiple nodes within a cluster of nodes in the destination services orchestration environment 402, each of the destination access object services 410 and 412 may be uniquely responsible for portions of the namespace and can apply the corresponding namespace updates. Therefore, the destination namespace copying controller service 408 can identify the destination access object services 410 and 412 that is responsible for copying the file which is updated in the source namespace, and communicate the namespace update for the file to the access object service identified for the file. The destination namespace copying controller service 408 can identify the appropriate destination access object service 410 or 412 by identifying a mapping created by a load balancer that used any identifier of the file to select the access object service from multiple access object services for copying the file, thereby identifying the same access object for copying a namespace update for the same file. For example, the destination namespace copying controller service 408 uses the mapping of the destination custom load balancer 406, which previously recorded assigning responsibility for the file that was named Greene to the destination access object service 410, to communicate the namespace update for the file to be named Green to the same destination access object service 410 which processed the file that was named Greene. The destination custom load balancer 406 can track any updates to the mapping function as services are relocated or added/removed. When the destination custom load balancer 406 distributes files to the destination access object service 410 or 412, any changes in the membership of the destination access object service 410 or 412 needs to be propagated only to the destination custom load balancer 406. If the destination namespace copying controller service 408 is responsible for distributing files to the destination access object service 410 or 412, the membership changes of the destination access object service 410 or 412 need to be propagated additionally to the destination namespace copying controller service 408.

Additionally, the destination namespace copying controller service 408 can identify the appropriate destination access object service 410 or 412 for copying the namespace update for the file by using any identifier of the file that a load balancer would have used. For example, since the namespace update for the file Patel is to create a file named Patel in the source namespace, the destination namespace copying controller service 408 cannot use the mapping of the destination custom load balancer 406 to assign this namespace update to either destination access object service 410 or 412 because no records exist for previously assigning responsibility for the new file named Patel to either destination access object service 410 or 412. Therefore, the destination namespace copying controller service 408 can identify the destination appropriate access object service 410 or 412 for the file Patel by using the same hash of the file handle or other information for the file Patel that the destination custom load balancer 406 would have used use to route the file Patel to one of the destination access object services 410 or 412.

When the content of a file has been modified on the source, which can be the Data Domain system 438 or the services orchestration environment 444, the source can calculate a differential of the file's LP tree relative to the previous snapshot of the file's LP tree, which may occur in parallel with copying namespace updates and/or files at the destination services orchestration environment 402. Since the differential of the file's LP tree can identify which parts of the file's LP tree changed, the source can send only the fingerprints corresponding to changed parts of the file's LP tree to the destination services orchestration environment 402, such as a changed L1 segment, instead of communicating all the fingerprints for the file to the destination services orchestration environment 402. Then the destination namespace copying controller service 408 can communicate these fingerprints for the modified file to the destination access object service 410 or 412 that is responsible for the file.

The access object service 410 or 412 can divide the received communication of a stream of fingerprints for the file being copied into L1 segments that correspond to consecutive data segments, which may be an average of 8 KB in size, depending on system properties because L1 segments are distributed to deduplication and compression service 414 or 416, which may be on different physical nodes. Since a L1 segment is of a variable size and aligns with a L0 data segment boundary, the access object service 410 or 412 may determine feature values for the received communication of a stream of fingerprints and then use the feature values as the basis for forming a L1 segment and determining a similarity group identifier. The access object service 410 or 412 can use a similarity group identifier to route a L1 segment to a deduplication and compression service 414 or 416 which is uniquely responsible for L1 segments that have a similarity group identifier that is in the range of similarity group identifiers for the deduplication and compression service 414 or 416.

As depicted in FIG. 4, if a similarity group identifier of 25 is determined for a L1 segment, then the access object service 410 or 412 routes the L1 segment to the deduplication and compression service 414, which processes L1 segments that have similarity group identifiers in the range of 0 to 63. In another example, if a similarity group identifier of 64 is determined for a L1 segment, then the access object service 410 or 412 routes the L1 segment to the deduplication and compression service 416, which processes L1 segments that have similarity group identifiers in the range of 64 to 127. Consistent routing enables the deduplication and compression services 414 and 416 to cache state to accelerate the deduplication process and avoid locking.

Achieving elevated levels of deduplication requires forming L1 segments, determining a similarity group identifier for each L1 segment, and routing each L1 segment to the appropriate deduplication and compression service 414 or 416 in a consistent manner. After a L1 segment is formed from the fingerprints for a data object or data file, future data objects or data files should have the same L1 segment boundaries in areas that are unmodified in the data objects or data files so that duplicate data segments may be identified. Since deduplication of L1 segments may reduce metadata overheads, forming L1 segments consistently also supports L1 segment deduplication.

There are several guiding principles when forming a L1 segment and determining a similarity group identifier. L1 segments should be formed from the fingerprints for the content of data objects or data files so that the formation is consistent for each data object or data file. L1 segments should store fingerprints for groups of data segments that have a minimum size and maximum size. A similarity group identifier should be determined for a L1 segment so that the determination is consistent for each L1 segment. The L1 segment formation and similarity group identifier determination should have low computational costs.

For Data Domain Boost, replication, and typical write paths, an access object service 410 or 412 does not have to generate the fingerprints required for the data segments because the access object service 410 or 412 already has access to client-generated fingerprints based on the 20-byte SHA-1 hash of each data segment. An access object service 410 or 412 can use a fingerprint which has already been generated for each data segment as the basis for forming L1 segments from fingerprints for groups of data segments and as the basis for determining a similarity group identifier for each L1 segment. An access object service 410 or 412 can go from left to right in the array of the received communication of a stream of fingerprints, skipping over fingerprints until the minimum size of a group of data segments for forming a L1 segment is reached.

Then an access object service 410 or 412 can determine a feature value for each subsequent fingerprint in the array. An example of a feature value is bytes 8-11 of a fingerprint of a data segment, which may have already been generated as a 20-byte SHA-1 hash of the data segment. The range of the value of such a 4-byte feature value is 0 to 4.294 billion.

If the currently processed fingerprint's feature value is larger than any feature value previously determined for previous fingerprints in the array which are for forming the current L1 segment, an access object service 410 or 412 can retain that feature value as the maximal feature value for forming the current L1 segment. An access object service 410 or 412 can also retain information identifying the position in the array of the fingerprint corresponding to the maximal feature value for forming the current L1 segment. An access object service 410 or 412 can continue determining the feature values for fingerprints from left to right in the array of fingerprints which are for forming the current L1 segment until the total size of the fingerprints for forming the current L1 segment reaches the maximum size of a group of fingerprints for forming any L1 segment. An access object service 410 or 412 can use the position of the fingerprint with the maximal feature value for forming the current L1 segment as the position that divides between the fingerprints for forming the current L1 segment and the fingerprints for forming the next L1 segment.

This example describes using the maximal value of the feature values that were determined for the specified subsection of fingerprints for forming the current L1 segment to identify the position of the fingerprint that divides fingerprints for forming the current L1 segment from the fingerprints for forming the next L1 segment. However, mathematical relationships other than the maximal value of these feature values may be used for forming the current L1 segment. For example, the minimal value of the feature values that were determined for the specified subsection of fingerprints for forming the current L1 segment may be used to identify the position of the fingerprint that divides the fingerprints for forming the current L1 segment from the fingerprints for forming the next L1 segment. Additional examples of the relationships to the feature values that may be used for forming the current L1 segment include the second highest value of the feature values, the second lowest value of the feature values, the third highest value of the feature values, and the third lowest value of the feature values, etc., for forming the current L1 segment.

The fingerprint that is identified as dividing the fingerprints for forming the current L1 segment from the fingerprints for forming the next L1 segment may be selected as either the ending fingerprint for forming the current L1 segment or as the beginning fingerprint for forming the next L1 segment. However, the same selection of the ending fingerprint for forming the current L1 segment or the beginning fingerprint for forming the next L1 segment must be consistently applied to the fingerprints for subsequent data objects or data files. Consequently, the boundaries of fingerprints for forming L1 segments are determined consistently for every data object or data file. If a user modifies data that is in only one data segment, and 1,000 data segments which average 8 KB in size are combined in a group of data segments that is 8 MB in size, the probability that the modified data segment is also the data segment which has the fingerprint with the maximal (or minimal) feature value for forming the current L1 segment is 1 divided by 1,000. Therefore, such a modification is highly unlikely to change the ending boundary for forming the L1 segment that corresponds to the fingerprint for the modified data segment and the beginning boundary for forming the subsequent L1 segment.

Therefore, an access object service 410 or 412 can consistently form L1 segments by basing a feature value on a 20-byte SHA-1 hash fingerprint for each data segment in the specified subsection of fingerprints for forming the current L1 segment. Then an access object service 410 or 412 can use the feature value to identify the fingerprint that is used to divide the group of fingerprints for forming the current L1 segment from the group of fingerprints for forming the subsequent L1 segment. Likewise, an access object service 410 or 412 can consistently route L1 segments by basing an additional feature value on a 20-byte SHA-1 hash fingerprint for each data segment in the specified subsection of fingerprints for forming the current L1 segment. Then an access object service 410 or 412 can use the additional feature as the basis to determine a similarity group identifier that is used to route the current L1 segment to the deduplication and compression service 414 or 416 which is uniquely responsible for L1 segments with the determined similarity group identifier.

For example, the maximal value of the bytes 8-11 from the fingerprints, which were generated by applying a 20-byte SHA-1 hash to each data segment in the specified subsection of data segments for forming the current L1 segment, was used to select the fingerprint that divides the fingerprints for forming the current L1 segment from the fingerprints for forming the next L1 segment. Based on this example, an access object service 410 or 412 can use the bytes 4-7 from the same 20-byte SHA-1 hash fingerprint for the same selected fingerprint as the basis for determining a similarity group identifier for routing the current L1 segment. In an alternative example, an access object service 410 or 412 can use the second highest value of the bytes 8-11 from the same 20-byte SHA-1 hash fingerprints as the basis for determining a similarity group identifier for routing the current L1 segment.

These examples describe using the maximal value and the second highest values of the 4 bytes from the fingerprints that were generated for each data segment in the specified subsection of data segments for forming the current L1 segment to determine a similarity group identifier for routing the current L1 segment for deduplication. However, mathematical relationships other than the maximal value or the second highest value of any part or all of each fingerprint may be used as an additional feature for determining the similarity group identifier for routing the current L1 segment for deduplication. For example, the minimal value of any part or all of each fingerprint that was generated for each data segment in the specified subsection of data segments for forming the current L1 segment may be used to determine a similarity group identifier for routing the current L1 segment. Additional examples of the mathematical relationships to any part or all of each fingerprint that may be used for routing the current L1 segment for deduplication include the second lowest value, the third highest value, or the third lowest value of any part or all of each fingerprint that was generated for each data segment in the specified subsection of data segments for forming the current L1 segment.

Since a similarity group identifier may be determined based on the values of 4 selected bytes, which form the alternative feature values, and which range from 0 to 4.294 billion, an access object service 410 or 412 can transform the selected alternative feature value's range of values to fall in the range of zero up to the highest number of similarity groups supported, such as 1,000. For example, an access object service 410 or 412 can apply a mod operator (such as the remainder after a value is divided by 1,000) to transform the selected alternative feature values to a similarity group identifier's value.

The deduplication and compression service 414 or 416 compares the newly received fingerprints against previously received fingerprints which were previously identified as unique fingerprints, and then determine which of the newly received fingerprints are unique, and therefore which of the corresponding data segments are unique. For example, the deduplication and compression service 414 selects one fingerprint from a part of the newly received L1 segment which corresponds to 1 MB of data segments, and then uses the selected fingerprint to query the fingerprint index 420 for the similarity groups identifiers for the deduplication and compression service 414. The fingerprint index 420 maps from <fp, simgroup>→<location where the segment is stored>. The location where the segment is stored consists of several numbers such as object ID, compression region offset, and compression region size. The deduplication and compression service 414 can use that location information as a key to another index that has the group of fingerprints stored for the part of the object surrounding the fingerprint. If the result from using the selected fingerprint to query the fingerprint index 420 is a key, then the deduplication and compression service 414 uses the key to load fingerprints previously determined to be unique from the local key value store 426, loads these unique fingerprints to an in-memory cache, and compares each of the newly received fingerprints against the unique fingerprints in the cache to identify which newly received fingerprints are missing from the unique fingerprints in the cache.

If a user had modified data that is in only one data segment of 1,000 data segments which are combined in a L0 group of data segments that corresponds to a L1 group of 1,000 fingerprints, the probability that the modified data segment is also the data segment for which the fingerprint was generated and subsequently selected for querying the fingerprint index 420 is 1 divided by 1,000. Therefore, such a modification is highly unlikely to result in generating a fingerprint that is not in the fingerprint index. If the result of using the selected fingerprint to query the fingerprint index 420 is not a key, then the deduplication and compression service 414 processes each of the recently received fingerprints as unique fingerprints or missing fingerprints. If the one fingerprint selected from the L1 group of 1,000 fingerprints is not in the fingerprint index 420, the probability is that the user had modified significantly more than one data segment for which fingerprints were generated in the L1 group of 1,000 fingerprints.

The deduplication and compression service 414 or 416 communicates the L1 segments' missing fingerprints for the file named Green back to the access object service 410 or 412 and through the namespace copying controller service 408, which communicates a request to the source for the L0 data segments for the file named Green which correspond to the missing fingerprints for the file named Green. The source loads the requested segments for the file named Green, compresses the requested file segments into compression regions, and communicates the compression regions to the services orchestration environment 402. The namespace copying controller service 408 routes the compression regions for the file named Green to the same access object service 410 that is processing the specific L1's fingerprints for the file named Green, which uses the similarity group identifier to communicate the compression regions to the same deduplication and compression service 414 which requested the file segments for the file named Green, and which stores the compression regions in the post-deduplication log 428. Alternatively, the source could communicate the compression regions for the file named Green directly to the appropriate deduplication and compression service 414 instead of bouncing through the namespace copying controller service 408 and the access object service 410. The packer service 418 reviews the post-deduplication log 428 for recently received compression regions for the file named Green, packs recently received compression regions into containers or large objects, and then stores the containers such as the large objects 432 and 434 to the underlying shared storage system 430, which may be a private or public object storage system or other highly-available shared storage system that can scale to the needed size and provide data access even if there are underlying hardware failures.

After the appropriate destination deduplication and compression service 414 or 416 stores these compression regions for a file in the post-deduplication log 428, a periodic mechanism synchronizes the access object service 410 or 412, which modifies the file's LP tree and stores the file's LP segments, which should synchronize the source and destination's LP trees. When these compression regions for a file have been stored in the destination post-deduplication log 428, the access object service 410 or 412 logs the file's new L0 segments and stores the file's LP tree in the distributed key value store 422, without accessing the stored segments, rolls up the checksums for the file's LP tree, and verifies synchronization of the source and destination's LP trees by comparing their respective rolled up checksums. As the modifications to files are copied from a source to the destination using the namespace copying controller service 408 and the access object services 410 and 412, the namespaces in the source and the destination are synchronized.

Then the access object service 410 or 412 stores the namespace update for a file in a distributed namespace data structure. For example, the access object service 410 stores the namespace update for renaming the file previously named Greene in the Human Relations employees namespace 424 which is stored in the distributed key value store 422 accessed by the access object service 410. The services orchestration environment 402 can also copy attribute changes to the namespace 424 in the distributed key value store 422, and make the fully updated namespace 424 readable via the distributed key value store 422.

Figure 1B:
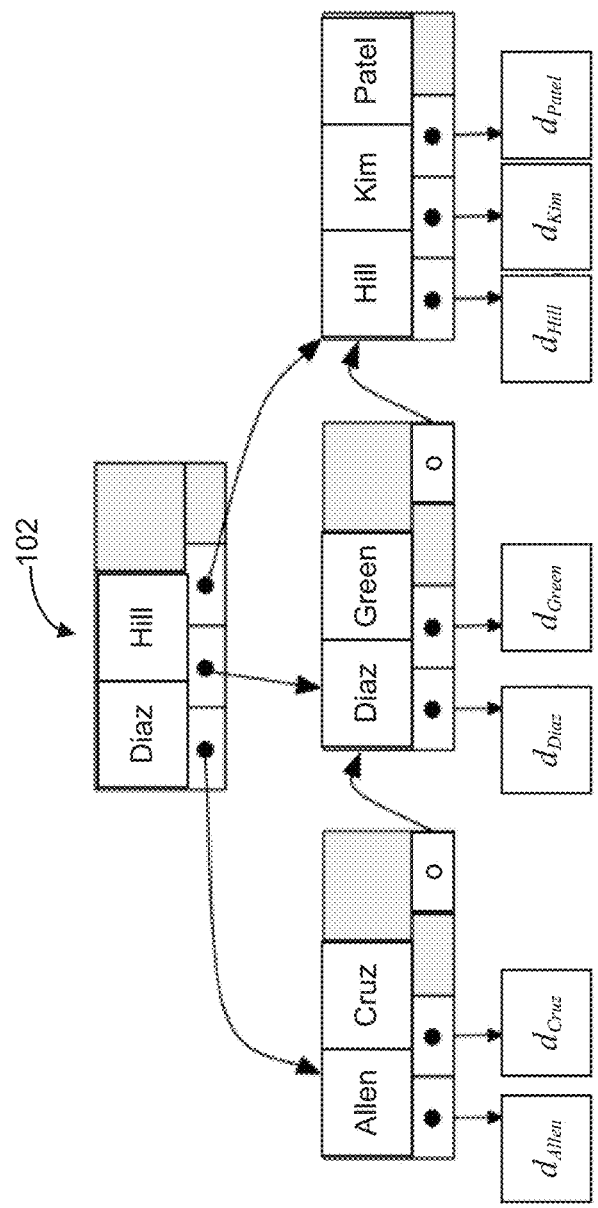

The order in which namespace updates for files are stored in the distributed namespace data structure corresponds to an order in which the files are arranged in a namespace data structure in the source of the file. For example, the access object service 410 stores the namespace update for renaming a file Green after the access object service 410 stores the namespace update for deleting the file named Diaz but before the access object service 412 stores any namespace update for the files named Hill, Kim, or Patel because FIG. 1B depicts that these files are arranged as the files named Diaz, Green, Hill, Kim, and Patel in the Human Relations employees namespace in the Human Relations DD system 438. The services orchestration environment 402 may use multiple copying threads to start copying the files named Cruz, Diaz, and Green in parallel, and the multiple copying threads may finish copying the files named Cruz and Green before finishing the copying of the file named Diaz. However, the services orchestration environment 402 will only enable the namespace update for the file named Green to be stored in the namespace 424 in the distributed key value store 422 after any pending update for the file named Diaz has already been stored in the namespace 424 in the distributed key value store 422.

Instead of the access object service 410 or 412 determining feature values for the received communication of a stream of fingerprints and then using the feature values as the basis for forming a L1 segment and determining a similarity group identifier, this feature value logic may be moved to the source of files to be copied, such as the Data Domain system 438, which may then form the L1 boundaries and generate the similarity group identifier for the file being copied. Remote procedure calls, handshakes, flags, or other protocols may be used to configure the services orchestration environment 402 to recognize in advance, or upon receipt of a stream of fingerprints, which sources of files will form L1 segments and determine the similarity group identifier for the L1 segment, such that the access object service 410 or 412 can use any already generated similarity group identifier to route any already formed L1 segment to the appropriate deduplication and compression services 414 and 416.

FIG. 4 also depicts a Data Domain Boost client 440, which can have communication paths to the custom load balancer service 406 and multiple deduplication and compression services 414 and 416. In Data Domain, metadata for a data segment may referred to as a seg_ref, and include the data segment's 20-byte SHA-1 hash fingerprint, the data segment's 4-byte XOR (exclusive or) value, the data segment's size, and a few other bytes. When a Data Domain Boost client typically writes data into a Data Domain system, the Data Domain Boost client forms data segments, generates the seg_refs, and communicates the seg_refs to the Data Domain system, which performs deduplication and responds by identifying the newly formed data segments which are unique. The Data Domain Boost client then creates compression regions, compresses the identified unique data segments in the compression regions, and communicates the compression regions to the Data Domain system.

Figure 5:
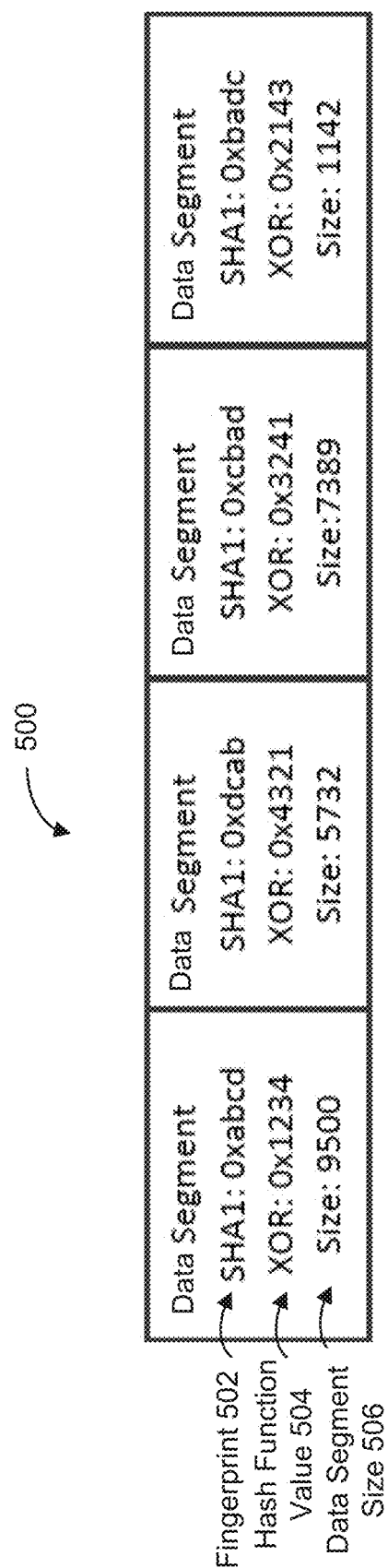
FIG. 5 is a block diagram illustrating metadata for a sequence of data segments for namespace and file copying according to one or more embodiments of the disclosure.

For examples of seg_refs, FIG. 5 depicts metadata 500 for a sequence of data segments which are a portion of a data file or data object that is being copied to the services orchestration environment 402. Each data segment is created in a content-defined manner with a data segment size that varies in a range, such as the range from 4 KB to 12 KB in Data Domain. Each data segment may be represented by metadata for a fingerprint 502, such as a 20-byte SHA-1 hash fingerprint, a hash function value 504, such as a 4-byte XOR value over the data segment, and the data segment size 506. The data segment size 506 is the least computationally expensive field to generate, followed by the 4-byte XOR hash function value 504, whereas the 20-byte SHA-1 hash fingerprint 502 is substantially more computationally expensive.

The Data Domain system 438 can form data segments, generate the seg_refs, use the seg_refs to determine which groups of fingerprints form L1 segments, and determine the similarity group identifiers for the L1 segments on the client side. Then the Data Domain system 438 can use the similarity group identifiers to route the L1 segments to the deduplication and compression services 414 and 416 which are responsible for processing L1 segments with the corresponding similarity group identifiers. Next, the responsible deduplication and compression services 414 and 416 perform deduplication, identify the newly received fingerprints that are unique, and communicate the identification of the unique fingerprints to the Data Domain system 438, which identifies data segments that correspond to the unique fingerprints, compresses the identified unique data segments in the compression regions, and communicates the compression regions to the responsible deduplication and compression services 414 and 416 for storage to the underlying shared storage system 430.

Similarly, replication from a legacy Data Domain system is supported without new expensive computations. FIG. 4 depicts that a Data Domain system replicating 436 into a cluster, which would have the same communication paths as Data Domain system 438, though the arrows illustrating the communication paths have been simplified. Data Domain replication has similarities to the functioning of the Data Domain system 438. The Data Domain Boost system, or a module within the Data Domain Boost, can process replicated data from a Data Domain system to form L1 segments and then route the L1 segments to the deduplication and compression service 414 or 416 consistently with the main write path for the system 400. There are various Data Domain replication algorithms, but at the core, when writing data, the source Data Domain system communicates the seg_refs for the data segments across a network and receives back a communication of the identifiers of the unique data segments to compress and transfer.

When a source closes a file that is being copied to a destination, the data and metadata for the file need to be committed. Instead of forcing the writing of a small object to the shared storage systems 430 to process the commit, the source issues a commit on the stream of fingerprints associated with copying the file, verifies that all of the compression regions which have been sent are stored in the corresponding post-deduplication log 428, and verifies that necessary LP segments are stored either to the persistent log (L1s) or to the corresponding key values store 422 (upper LPs). The access object services 410 and 412 verify that all data has been committed with callbacks from other services, such as multiple deduplication and compression services 414 and 416, and then roll up the LP checksum for the file at the destination and compare this checksum with the LP checksum for the file at the source.

Shortly after a file is copied to a destination, the services orchestration environment 402 may receive a read request for the file before the file's L0 data segments have been copied to the shared storage system 430, but while these L0 data segments may still be stored in-memory for the segment storage cache. This situation of attempting to read data segments before the data segments have been written to a storage system is not an issue for namespace updates because the updated namespace only becomes visible after the corresponding B+ tree is updated and exposed to access by clients. Since the access object services 410 and 412 can route each L1 segment of fingerprints and their L0 data segments based on the similarity group identifier for each L1 segment of fingerprints, the access object services 410 and 412 can direct such a read-after-write request to the same deduplication and compression service 414 or 416 which copied the L1 segment of fingerprints and their L0 data segments to memory for the segment storage cache, where these segments will likely still be cached. If a deduplication and compression service 414 or 416 crashes, the services orchestration environment 402 can replay the post-deduplication log 428 to bring the cache status up to date. Once these segments have been written to the shared storage system 430, the services orchestration environment 402 can truncate the post-deduplication log 428, and evict these segments from the memory cache.

Copying a Namespace Update and a File from a Source Services Orchestration Environment Copying a namespace update and a file from the source services orchestration environment 402 to the destination services orchestration environment 444 or the Data Domain system 438 has many of the same steps as the Data Domain system 438 copying a namespace update and a file to the destination services orchestration environment 402. The main difference, compared to having the Data Domain system 438 as the source, is that the services orchestration environment 402 source side is divided into services that may be on different physical nodes. Additionally, instances of the namespace copying controller service 408 may execute on both the source side as well as on the destination side. Since all communications may flow through an instance of the namespace copying controller service 408 on both the source and destination sides, the access object services 410 and 412 and/or the deduplication and compression services 414 and 416 may be optimized to communicate across the network to gain more parallelism in some embodiments.

First, the namespace copying controller service 408 receives a request to copy a namespace to a destination, such as a request to copy the Human Relations employees namespace 424 to a destination, which could be the services orchestration environment 444 or the Data Domain system 438. Then the namespace copying controller service 408 identifies a namespace update for the file associated with the namespace, such as calculating the differential of a current snapshot of the Human Relations employees namespace relative to a previous snapshot of the Human Relations employees namespace to identify an update to rename the employee file previously named Greene as the employee file named Green in the Human Relations employees namespace. Next, the namespace copying controller service 408 communicates the namespace update for the file to the destination, such as communicating the namespace update the file named Greene to the services orchestration environment 444 or the Data Domain system 438.

Additionally, the namespace copying controller service 408 can receive a request to copy a file to a destination, such as a request to copy the file named Green to a destination, which could be the services orchestration environment 444 or the Data Domain system 438. The namespace copying controller service 408 uses the file handle or other information for the file to be copied to determine which of the access object services 410 and 412 on the source side will receive a communication of the stream of fingerprints for the file's segments. Then the namespace copying controller service 408 takes a snapshot of the LP tree for the file and calculates a differential relative to a previous snapshot of the LP tree for the file which was stored in the distributed key value store 422.

After reading from the top of the LP tree to a L1 reference, the L1 group of fingerprints corresponding to sequential segments in the file may be identified by the namespace copying controller service 408 determining a difference between the current snapshot of L1 groups of fingerprints (which includes the identified L1 group of fingerprints) and a previous snapshot of the L1 groups of fingerprints. The namespace copying controller service 408 can direct the copy request to the access object service 410 or 412 which is responsible for the identified L1 segment of fingerprints, and the responsible access object service 410 or 412 can use the similarity group identifier for the identified L1 segment of fingerprints to determine which of the deduplication and compression services 414 or 416 to contact to request some of the file's fingerprints. Since the differentials are calculated to identify only the L1 segments of fingerprints which have been modified, the namespace copying controller service 408 can direct a copy request for each L1 segment of fingerprints to the access object service 410 and 412.

That contacted deduplication and compression service 414 or 416 can read the L1 segment corresponding to the similarity group identifier, which may be in a local key value store 426 or the object storage 430, extract the group of fingerprints from the L1 segment, and communicate the group of fingerprints to the appropriate access object service 410 or 412. which can communicate the group of fingerprints and the similarity group identifier via the namespace copying controller service 408 to the destination services orchestration environment 444 or the Data Domain system 438. Since the L1 segment and its similarity group identifier are already known and provided, they do not have to be determined by the destination services orchestration environment 444 or the Data Domain system 438.

When the destination services orchestration environment 444, or the Data Domain system 438, identifies fingerprints missing in the destination, and then requests the file segments identified by these missing fingerprints, the appropriate access object service 410 or 412 can receive a communication of the request for these file segments identifier via the namespace copying controller service 408, and then use the corresponding similarity group identifier to communicate this request to the appropriate deduplication and compression service 414 or 416. The appropriate deduplication and compression service 414 or 416 can retrieve the requested segments from the shared storage system, 430, compress the requested segments into compression regions, and communicate the compression regions to the appropriate access object service 410 or 412, which can communicate the compression regions identifier via the namespace copying controller service 408 to the Data Domain system 438, or the destination services orchestration environment 444 which can store the compression regions to the destination shared storage system 446, as part of copying the file from the source services orchestration environment 402. Storing these compression regions for a file enables the destination to store the namespace update for the file in a namespace data structure, such as enabling the destination services orchestration environment 444 to store the namespace update for renaming the file previously named Greene in the destination's Human Relations employees namespace in the destination's shared storage system 446.

Stream management does not change for the file copying. After starting the file copying, each time a stream is requested for an access object service instance to process, a value that represents the current capacity of streams that the services orchestration environment 402 can process at desired performance levels is decremented by one. Each time that an access object service instance finishes with its stream, the value is incremented by one. When the value is zero, no more streams will be accepted by an access object service instance, thereby functioning as a way to throttle the number of parallel files being copied.

Since there are numerous errors which can occur while copying a data file from a source to destination, data file copying systems need to verify that a data file has been correctly copied before ending the copying process. If some data in the file is missing or corrupted, then an important copy of the data file may no longer be available for a data user during a disaster recovery situation. Data file copying systems may respond to an error being detected in the copying of a data file by beginning the process of copying the data file over from the beginning of the copying process. For small data files, this is a reasonable approach, but for large data files which are hundreds of gigabytes (GBs) to terabytes (TBs) in size, resending all of the fingerprints and segments for the data file can take a long time. Therefore, a data file copying system can create checkpoints, and then respond to an error being detected in the copying of a data file by continuing the file copying process from the last checkpoint, without having to restart the file copying process from the beginning.

Some protection already exists for many types of errors which can occur when copying a data file between components, such as the Data Domain system 438 and the Data Domain Boost client 440, including protection against many errors created by network outages, process failures, and data corruption during transfer. However, there are many additional types of errors that can occur when copying a data file to or from a services orchestration environment 402. A new complexity of the services orchestration environment 402 is that any individual instance of the namespace service, an access object service, a deduplication and compression service, or any other type of service which is processing a data file's segments and/or fingerprints may fail temporarily and then restart, potentially losing copying state.

The services orchestration environment 402 can manage such errors in the copying of data files by assigning a generation identifier, which is a monotonically increasing number that indicates when a service instance started executing, to each service instance and then tracking each service instance's generation number. Consequently, a generation identifier functions as a timestamp. When a service instance begins executing, the services orchestration environment 402 retrieves a generation identifier from a central location, such as a record in a distributed key value store, assigns the generation identifier to the service instance, and then increments the generation identifier in the distributed key value store, which is fault tolerant and maintains 2*f+1 generation identifiers for handling f failures. Hence, the services orchestration environment 402 will not lose these generation identifiers unless there is a failure of f service instances.

For example, the services orchestration environment 402 assigns the generation identifier of 9 to the namespace copying controller service 408, a generation identifier of 10 to the access object service 410, a generation identifier of 11 to the deduplication and compression service 414, and a generation identifier of 12 to the deduplication and compression service 416. If the deduplication and compression service 414 with the generation identifier of 11 fails and restarts, the services orchestration environment 402 assigns the new generation identifier of 13 to the deduplication and compression service 414. If the deduplication and compression service 416 with the generation identifier of 12 fails and restarts, the services orchestration environment 402 assigns the new generation identifier of 14 to the deduplication and compression service 416.

Continuing the example, when copying a data file to a services orchestration environment 402, the source of the data file communicates with the namespace copying controller service 408 and receive its generation identifier of 9. As copying of the data file is completing, the source communicates with the namespace copying controller service 408 and queries its generation identifier again. If the currently queried value for the generation identifier of the namespace copying controller service 408 matches the source's recorded value of 9 for the generation identifier of the namespace copying controller service 408, then this match indicates that the namespace copying controller service 408 continued running during the copying of the data file, such that the services orchestration environment 402 safely commits the data file's segments and fingerprints. If the currently queried value for the generation identifier of the namespace copying controller service 408 does not match the source's recorded value of 9 for the generation identifier of the namespace copying controller service 408, then this lack of a match indicates that the namespace copying controller service 408 restarted during the copying of the data file, such that some the data file's segments and/or fingerprints may have been lost, and the services orchestration environment 402 follows an error recovery procedure.

Likewise, during the copying of a data file to a services orchestration environment 402, the namespace copying controller service 408 communicates with the access object service instance 410 and receive its generation identifier of 10. As copying of the data file is completing, the namespace copying controller service 408 communicates with the access object service 410 and queries its generation identifier again. If the currently queried value for the generation identifier of the access object service 410 matches the namespace copying controller service 408's recorded value of 10 for the generation identifier of the access object service 410, then this match indicates that the access object service 410 continued running during the copying of the data file, such that the services orchestration environment 402 safely commits the data file's segments and fingerprints. If the currently queried value for the generation identifier of the access object service 410 does not match the namespace copying controller service 408's recorded value of 10 for the generation identifier of the access object service 410, then this lack of a match indicates that the access object service 410 restarted during the copying of the data file, such that some the data file's segments and/or fingerprints may have been lost, and the services orchestration environment 402 follows an error recovery procedure.

Similarly, when the access object service 410 communicates a file's fingerprints to the deduplication and compression service 414 and the deduplication and compression service 416, the access object service 410 queries the deduplication and compression service 414 and the deduplication and compression service 416 for their generation identifiers of 11 and 12, respectively. As copying of the data file is completing, the access object service 410 communicates segments to the deduplication and compression service 414 and the deduplication and compression service 416, and queries the deduplication and compression service 414 and the deduplication and compression service 416 for their current generation identifiers. If the currently queried values for the generation identifiers of the deduplication and compression services 414 and 416 match the access object service 410's recorded values of 11 and 12 for the generation identifiers of the deduplication and compression services 414 and 416, then these matches indicate that the deduplication and compression services 414 and 416 continued running during the copying of the data file, such that the services orchestration environment 402 safely commits the data file's segments and fingerprints. However, either or both of the currently queried values for the generation identifiers of the deduplication and compression services 414 and 416 may not match the access object service 410's recorded values of 11 and 12 for the generation identifiers of the deduplication and compression services 414 and 416. In this situation, the deduplication and compression services 414 and/or 416 which lacks a match for its recorded generation identifier must have restarted during the copying of the data file, such that some of the data file's segments and/or fingerprints may have been lost, and the services orchestration environment 402 follows an error recovery procedure.

In terms of failure situations, the basic technique is to recognize a failure and restart the file copying process. If a source Data Domain system 438 fails while copying a data file's segments and/or fingerprints to the services orchestration environment 402, then the copying of the data file can restart from the last confirmed update of the B+ tree stored as the namespace 424 in the distributed key value store 422, which is logged periodically. If the namespace copying controller service 408 fails while processing a data file's segments and/or fingerprints, then the copying of the data file can restart from the last confirmed update of the B+ tree stored as the namespace 424 in the distributed key value store 422. If a destination access object service 410 or 412 fails while processing a data file's segments and/or fingerprints, then the copying of the data file restarts. If a destination deduplication and compression service 414 or 416 fails while processing a data file's segments and/or fingerprints, then the copying of the data file may be restarted, or an access object service 410 or 412 may have enough tracking state to continue processing the data file's segments and/or fingerprints based on the last time data was committed or the last amount of data that was committed.

Upon failure of copying a data file, the source namespace copying controller service 408 can restart the file copying from the last confirmed update of the B+ tree stored as the namespace 424 in the distributed key value store 422. Upon failure of copying a data file, a source access object service restarts the file copying from the beginning even if another source access object service takes over that file handle space for the data file for which copying failed. Upon failure of copying a data file, a source deduplication and compression service either restarts the copying process or another instance of a source deduplication and compression service can take over that range of similarity group identifiers which include the data file's similarity group identifier and continue to service the current state of the file copying without restarting the file copying process from the beginning of the data file copying process.

When an error in detected in the copying of a data file, some of the data file's segments and their corresponding fingerprints may have already copied correctly to the destination. Consequently, subsequently received fingerprints which correspond to those portions of the correctly copied segments will be detected as duplicates of the correctly copied segments' fingerprints, such that resending these data file's segments is not necessary. Furthermore, a garbage collection service may have removed any unreferenced segments from an incomplete copy of the data file. Therefore, if checkpoints are created for the file copying process, then the services orchestration environment 402 can use these checkpoints to continue the file copying process from the last checkpoint, without having to restart the file copying process from the beginning. The services orchestration environment 402 can create a checkpoint based on the amount of segments and fingerprints sent from the source of the data file to the destination of the data file, such as every 100 MB, or based on a time threshold, such as every 10 minutes.

For example, the services orchestration environment 402 restarts all communications for a copying file because the time when the deduplication and compression service 414 restarted and received the new generation identifier of 13 was less than 10 minutes after the copying of the file began and corresponds to checkpoint which was created after the number of fingerprints received from the source correspond to less than 100 MB of data segments. In an alternative example, the services orchestration environment 402 resends only the last segments to the deduplication and compression service 414 because the time when the deduplication and compression service 414 restarted and received the new generation identifier of 13 was immediately before the deduplication and compression service 414 received the communication of the last segments. This time was also hours after the copying of the file began and corresponds to a checkpoint which was created after the number of fingerprints received from the source correspond to more than 1,000 MB (1 GB), of data segments.

In a distributed computing environment, checkpointing is a technique that helps tolerate failures that otherwise would force long-running processes to restart from the beginning. The most basic way to implement checkpointing is to stop the process, copy all the required data from the memory to reliable storage, such as a parallel file system, and then continue with the process. In case of failure, when the process restarts, it does not need to start from the beginning. Rather, the process can read the latest state ("the checkpoint") from the stable storage and execute from that. In the coordinated checkpointing approach, processes must ensure that their checkpoints are consistent. This is usually achieved by some kind of two-phase commit protocol algorithm. In the uncoordinated checkpointing, each process checkpoints its own state independently.

After a number of transactions had been processed, a "snapshot" or "checkpoint" of the state of the process is taken. If the process fails before the next checkpoint, the process can restart by using the checkpoint information and the last place in the transaction file where a transaction had successfully completed. The process can then restart at that point.

Checkpointing tends to be expensive, so it is generally not done with every record, but at some reasonable compromise between the cost of a checkpoint against the value of the computer time needed to reprocess a batch of records. Thus, the number of records processed for each checkpoint might range from 25 to 200, depending on cost factors, the relative complexity of the process, and the resources needed to successfully restart the process.

Another alternative to restarting the file copying process from the beginning is based on the last confirmed update of the B+ tree stored as the namespace 424 in the distributed key value store 422. Since the order in which namespace updates for files are stored in the destination B+ tree in the distributed key value store 422 corresponds to the order in which the files are arranged in the source namespace B+ tree, this order ensures that the last entry on the destination B+ tree is the last file that was successfully copied to the destination. Consequently, if during the file copying process the generation identifiers for the namespace copying controller service 408 change, or the source Data Domain system 438 fails, then the services orchestration environment 402 can identify the last key in the destination B+ tree as corresponding to the last file successfully copied, seek to that key on the source B+ tree and restart replication from the next key on the source B+ tree, without having to restart the file copying process from the beginning.

Figure 6A:
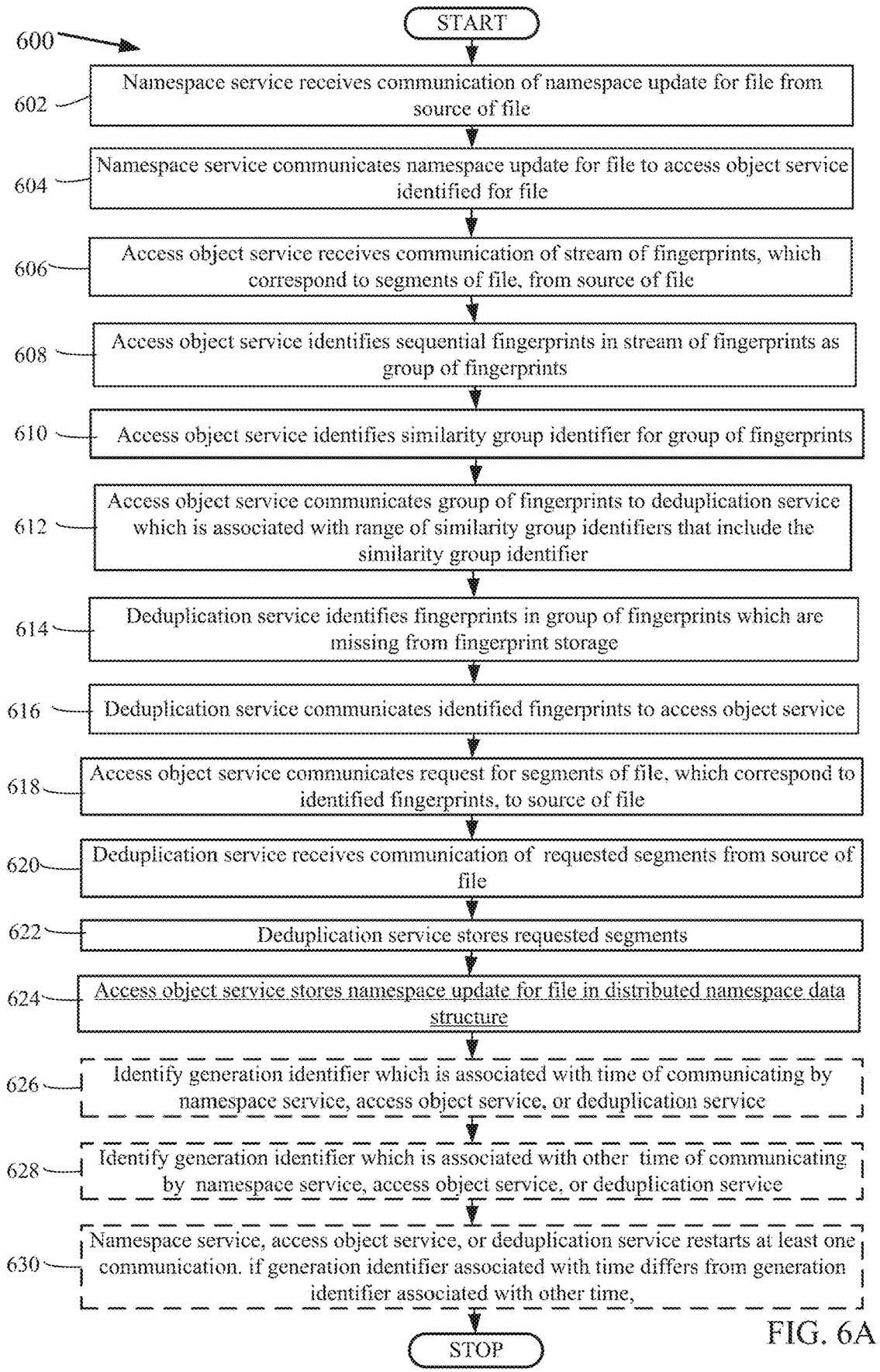
FIGS. 6A-C are block diagrams illustrating example methods for namespace and file copying according to one or more embodiments of the disclosure.
Figure 6B:
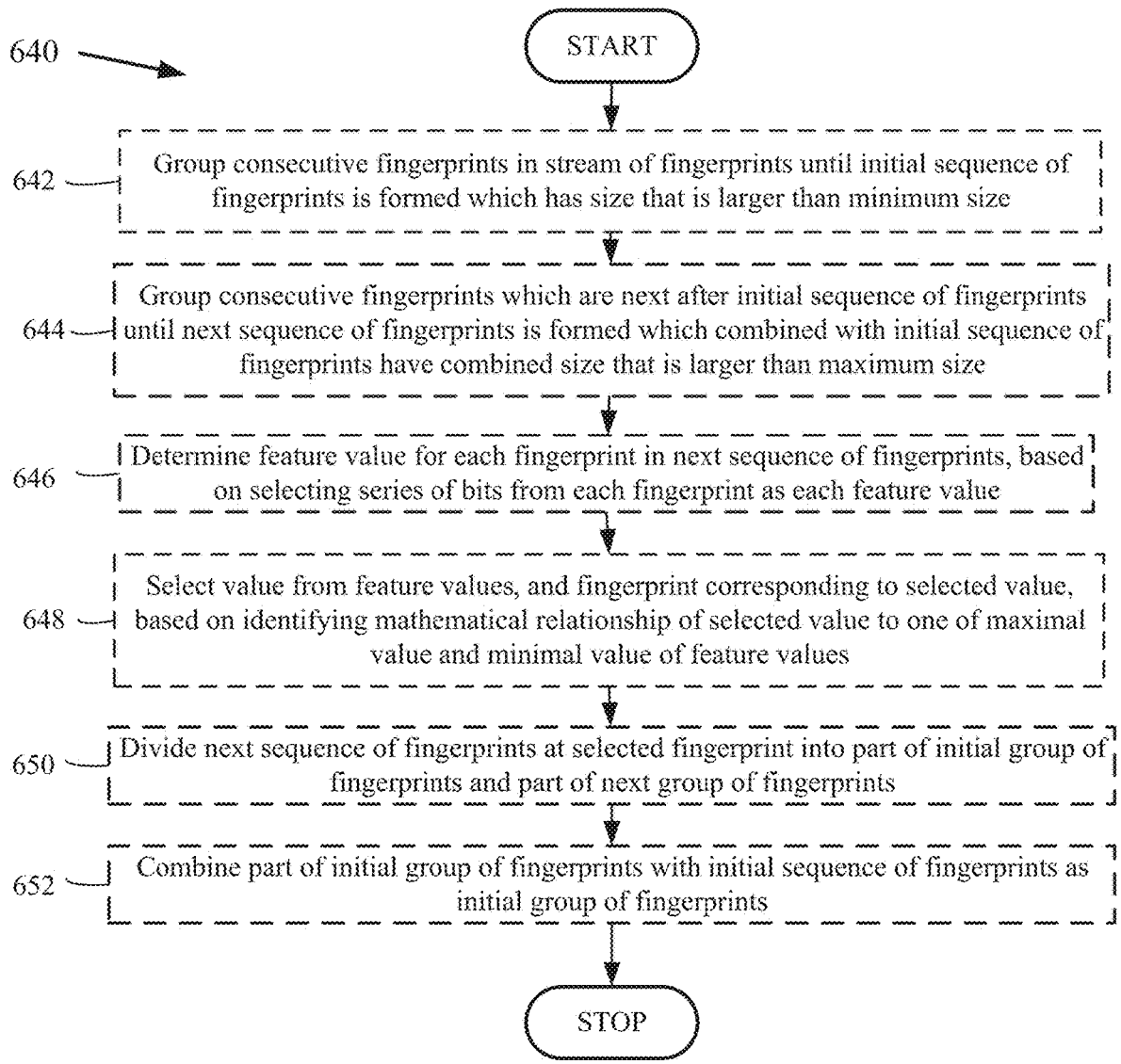
Figure 6C:
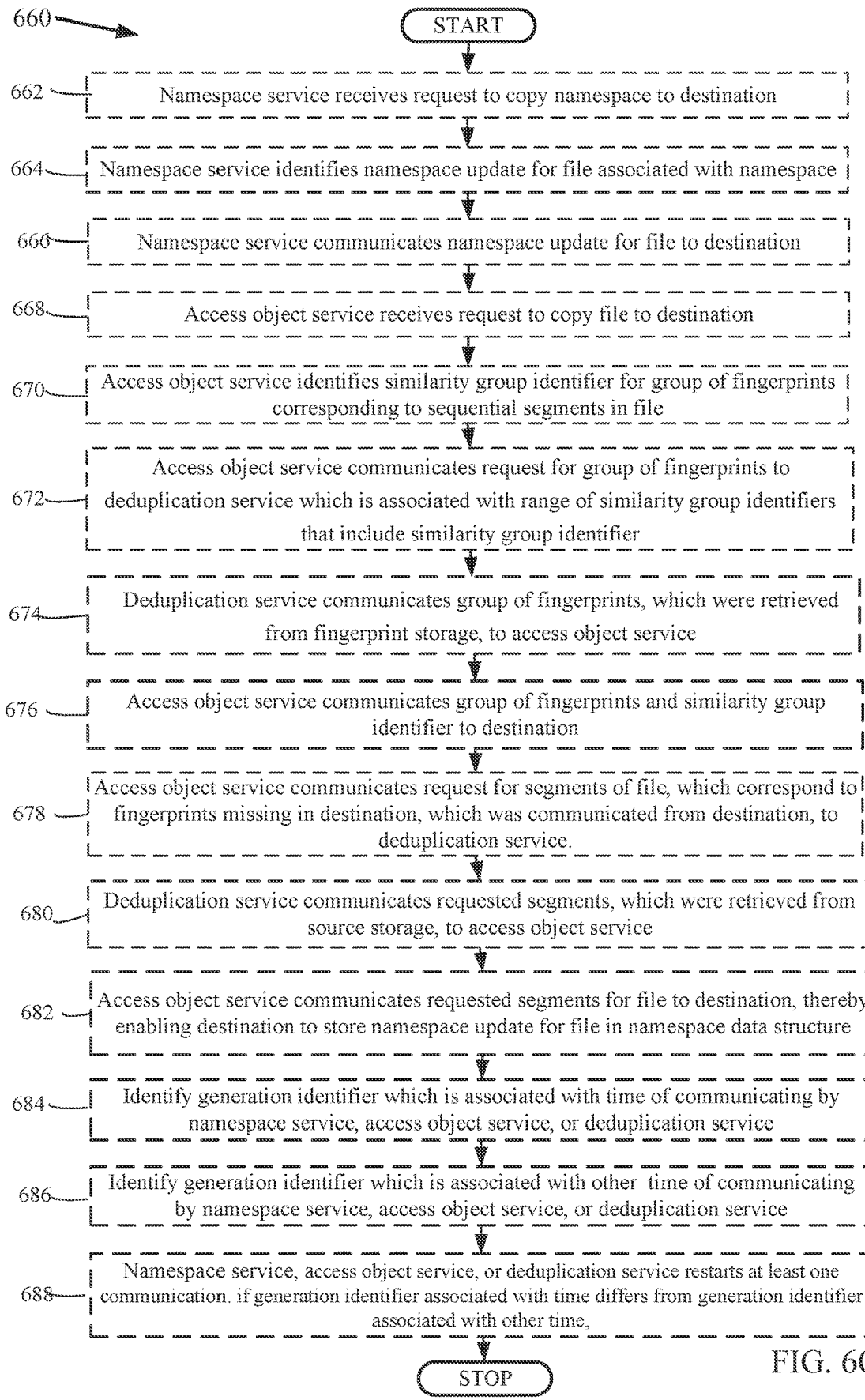

FIGS. 6A-C are flowcharts that illustrate methods for namespace and file copying under an embodiment. Flowchart 600 illustrates method acts illustrated as flowchart blocks for certain steps involved in the client system 202, the backup system 204, the backup server 206, the clustered storage system 208, and the services orchestration environment 210 of FIG. 2A. FIG. 6A depicts the flowchart 600 as a method for destination namespace and file copying and error handling, with the method acts illustrated as flowchart blocks 602-630.

A namespace service receives a communication of a namespace update for a file from a source of the file, block 602. The system receives a namespace update for a file from the file's source. By way of example and without limitation, this can include the namespace copying controller service 408 receiving an update for a Human Relations employees namespace, the update being to rename an employee file previously named Greene as an employee file named Green, from the Human Relations DD system 438 that manages the employee files. A namespace service can be a component that provides functions for a set of identifiers that are used to refer to distinct types of objects. A namespace update can be a modification to a set of identifiers that are used to refer to distinct types of objects.

After receiving the name space update, the namespace service communicates the namespace update for the file to an access object service identified for the file, block 604. Identifying the access object service for the file may include using any identifier of the file or a mapping created by a load balancer that used any identifier of the file to identify the access object service from access object services, to identify the access object service from multiple access object services. The system sends the namespace update for a file to the same access object service which will process the copying of the file. In embodiments, this can include the namespace copying controller service 408 using the mapping of the custom load balancer 406, which previously recorded allocating the file that was named Greene to the access object service 410, to communicate the namespace update for the file to be named Green to the same access object service 410 which processed the file that was named Greene. A mapping can be an association between each element of a given set with one or more elements of a second set.

In addition to receiving the namespace update, an access object service receives a communication of a stream of fingerprints, which correspond to segments of the file, from the source of the file, block 606. The system receives fingerprints for segments in a file that is to be copied from a source. For example, and without limitation, this can include the access object service 410 receiving a communication of a stream of 20-byte SHA-1 hash fingerprints for segments in the file named Green being currently copied from the Data Domain system 438 to the destination services orchestration environment 402.

A source can be an origin from where a file is received. A file can be a collection of data stored in a computer's memory or on a storage device under a single identifying name. A segment can be a part into which a file is divided. A stream of fingerprints can be a series of bit strings which were mapped from larger data objects or data files, and which uniquely identify the larger data objects or data files, which are made available over time. An access object service can be a component that provides functions for processing data structures used by computers.

The namespace copying controller service 408 can use the mapping of a load balancer, which would have used identifiers of files to select previous access object services, to select which of the current access object services will receive the communication of the stream of fingerprints for the file's segments. For example, the namespace copying controller service 408 uses the mapping of the custom load balancer 406, which previously hashed the name of the file named Greene to the access object service 410 for a previous incoming stream of fingerprints, to identify a mapping value to route the stream of fingerprints for the file named Green to the access object service 410, instead of to the access object service 412. A load balancer can be an entity that distributes a set of tasks over a set of resources, with the aim of making the overall processing of the tasks more efficient. An identifier can be a sequence of characters used to refer to an entity.

After receiving a communication of a stream of fingerprints, an access object service identifies sequential fingerprints in the stream of fingerprints as a group of fingerprints, block 608. The system identifies a group of fingerprints which will be processed together. By way of example and without limitation, this can include the access object service 410 identifying an existing group of fingerprints numbered 1 to 509 which the Data Domain system 438 has already created from the stream of fingerprints for the file named Green.

In an alternative example, the access object service 410 executes the blocks 642-652, as depicted by FIG. 6B, to generate a group of fingerprints for the file named Green being copied from the client 442 to the services orchestration environment 402. Sequential fingerprints can be consecutive bit strings which were mapped from larger data objects or data files, and which uniquely identify the larger data objects or data files. Any group of fingerprints can be a collection of consecutive portions of bit strings which were mapped from larger data objects or data files, and which uniquely identify the larger data objects or data files.

Following the identification of a group of segments, an access object service identifies a similarity group identifier for the group of fingerprints, block 610. The system identifies a group identifier to consistently route groups of fingerprints which are similar to each other. In embodiments, this can include the access object service 410 identifying an existing similarity group identifier of 483, for the group of fingerprints numbered 1 to 509, which the Data Domain system 438 has already created for the group of fingerprints in the file named Green being copied from the Data Domain system 438 to the destination services orchestration environment 402. A similarity group identifier can be a specified number which refers to how much a group of data segments resembles other groups of data segments.

In an alternative example, the access object service 410 generates a similarity group identifier for the group of fingerprints in the file named Green being copied from the client 442 to the services orchestration environment 402. If the access object service 410 executes the blocks 642-652, during the grouping of consecutive fingerprints as the next sequence of fingerprints, or after the selecting of a value from the feature values and a fingerprint corresponding to the selected value, an additional feature value may be determined for at least one fingerprint in the next sequence of fingerprints, by selecting a series of bits from the fingerprints, wherein the selected series of bits is mutually exclusive of any series of bits selected for the feature values. The system can determine additional feature values for fingerprints in the group, based on the value of specific bytes for fingerprints in the specified subsection of fingerprints for forming the current L1 segment. For example, the access object service 410 identifies the value of 4.147483 billion for the bytes 4 to 7 of the 20-byte SHA-1 hash fingerprint for the selected data fingerprint 509. In another example, the access object service 410 identifies the value of 4.283269 billion as the second highest value of bytes 8 to 11 of the 20-byte SHA-1 hash fingerprints for these next 500 fingerprints, so that the second highest value of 4.283269 billion may be used as the basis for determining a similarity group identifier. Any feature value can be a numerical amount of an attribute of something. A series of bits can be a sequence of binary digits.

Having determined at least one additional feature value, a similarity group identifier may be determined based on one of the at least one additional feature value, which may include identifying a mathematical relationship of the one of the at least one additional feature values to a maximal value or a minimal value of the at least one additional feature value. The system can determine a similarity group identifier for routing the current L1 segment to a deduplication and compression service, and the similarity group identifier may be based on the maximal (or minimal) value of specific bytes of each fingerprint in the specified subsection of fingerprints for forming the current L1 segment. For example, the access object service 410 determines an unscaled similarity group identifier of 4.147483 billion for the bytes 4 to 7 of the SHA-1 hash fingerprint for the selected fingerprint number 509. In an alternative example, the access object service 410 determines an unscaled similarity group identifier of 4.283269 billion for the fingerprint number 505 because the data segment number 505 has the second highest value of the bytes 8 to 11 of each 20-byte SHA-1 hash fingerprint for the data segments numbered 251 to 750.

A mathematical relationship can be how values are associated on a numerical basis. A maximal value can be the largest numerical amount of an attribute of some things within a specific range of things. A minimal value can be the smallest numerical amount of an attribute of some things within a specific range of things.

Since a similarity group identifier may be determined based on the values of 4 selected bytes, which form the alternative feature values, and which range from 0 to 4.294 billion, an access object service 410 or 412 can transform the selected alternative feature value's range of values to fall in the range of zero up to the highest number of similarity groups supported, such as 1,000. For example, the access object service 410 applies a mod operator (such as the remainder after a value is divided by 1,000) to transform the selected alternative feature value to a similarity group identifier's value, such as the remainder of 483 after 4.147483 billion is divided by 1,000, or the remainder of 269 after 4.283269 billion is divided by 1,000.

After identifying a group of fingerprints and a similarity group identifier for the group of fingerprints, an access object service communicates the group of fingerprints to a deduplication service which is associated with a range of similarity group identifiers that include the similarity group identifier, block 612. The system uses a similarity group identifier to communicate a group of fingerprints to a deduplication and compression service that processes similar groups of fingerprints. For example, and without limitation, this can include the access object service 410 using the similarity group identifier of 483 to route the group of fingerprints numbered 1 to 509 as the current L1 segment to be deduplicated by the deduplication and compression service 414, which deduplicates L1 segments with similarity group identifiers in the range of 0 to 500. In an alternative example, the access object service 410 uses the similarity group identifier of 269 to route the group of fingerprints numbered 1 to 509 as the current L1 segment, to be deduplicated by the deduplication and compression service 414, which deduplicates L1 segments with similarity group identifiers in the range of 0 to 500. A deduplication service can be a component that provides functions for the elimination of redundant information. A range of similarity group identifiers can be a set of numbers between lower and upper limits of a scale which refers to how much groups of data segments resemble other groups of data segments.

Following receipt of a group of fingerprints which might be already stored in a fingerprint storage, a deduplication service identifies fingerprints in the group of fingerprints which are missing from the fingerprint storage, block 614. The system identifies the newly received fingerprints which were not previously received, and therefore correspond to new segments in the file which is being copied. By way of example and without limitation, this can include the deduplication and compression service 414 identifying fingerprints numbered 2-7, 11-13, and 17-19, from the group of fingerprints numbered 1 to 509, as fingerprints which are missing from the local fingerprint index 420. A fingerprint can be a bit string which was mapped from a larger data object or data file, and which uniquely identifies the larger data object or data file. A fingerprint storage can be recording media that retains bit strings which were mapped from larger data files, and which uniquely identify the larger data files.

Having identified newly received fingerprints which were not previously received, a deduplication service communicates the identified fingerprints to an access object service, block 616. The system uses the identification of any missing fingerprints to request their file segments, which evidently have not been received before. In embodiments, this can include the deduplication and compression service 414 communicating the fingerprints numbered 2-7, 11-13, and 17-19 to the access object service 410.

After receiving the communication of the identification of missing fingerprints, an access object service communicates a request for file segments, which correspond to the identified fingerprints, to the source of the file, block 618. The system requests the source of a file to provide the segments corresponding to the missing fingerprints. For example, and without limitation, this can include the access object service 410 requesting file segments numbered 2-7, 11-13, and 17-19, which correspond to the missing fingerprints numbered 2-7, 11-13, and 17-19 for the file named Green, from the Data Domain system 438, via the namespace copying controller service 408. A request can be an instruction to a computer to provide information or perform another function.

After requesting a source to provide file segments corresponding to missing fingerprints, a deduplication service receives a communication of the requested segments from the source of the file, block 620. The system receives the file segments corresponding to the fingerprints which were not received before. By way of example and without limitation, this can include the deduplication and compression service 414 receiving a communication of the file segments numbered 2-7, 11-13, and 17-19, compressed into compression regions, from the access object service 410, which received a communication of the file segments numbered 2-7, 11-13, and 17-19 for the file named Green, compressed into compression regions from the Data Domain system 438, via the namespace copying controller service 408. When received, a communication of the requested file segments may be in a compressed format, which can be a designed structure for the storage of data which is reduced relative to its original size.

Following receipt of requested segments from the source, a deduplication service stores the requested segments for the file, block 622. The system stores the requested segments locally, which evidently have not been previously stored locally. In embodiments, this can include the deduplication and compression service 414 storing the missing fingerprints in the fingerprint index 420, and also storing the file segments numbered 2-7, 11-13, and 17-19 for the file named Green, compressed into compression regions in the post-deduplication log 428. Then the packer service 418 reviews the post-deduplication log 428 for recently received compression regions, packs recently received compression regions which include the file segments numbered 2-7, 11-13, and 17-19 for the file named Green into a container, such as the large object 432, and then stores the large object 432 to a destination storage, such as the underlying shared storage system 430.

A packer service can be a component that provides functions for storing a collection of objects. A container can be a data structure that is a collection of objects. A destination storage can be recording media which retains digital information and is associated with where a file is sent.

Once the requested segments for the file have been stored, the access object service stores the namespace update for the file in a distributed namespace data structure, block 624. The system updates its namespace for a file after the file's updated segments have been stored. The order in which namespace updates for files are stored in the distributed namespace data structure may correspond to the order in which the files are arranged in a namespace data structure in the source of the file. For example, and without limitation, this can include the access object service 410 storing the namespace update for renaming the file previously named Greene in the Human Relations employees namespace 424 in the key value store 422, after storing the namespace update for deleting the file named Diaz, but before storing any namespace update for the files named Hill, Kim, or Patel because FIG. 1B depicts that these files are arranged as files named Diaz, Green, Hill, Kim, and Patel in the Human Relations employees namespace in the Human Relations DD system 438.

A namespace data structure can be a storage organization for a set of identifiers that are used to refer to distinct types of objects. A distributed namespace data structure can be a shared storage organization for a set of identifiers that are used to refer to distinct types of objects. An order can be the arrangement or of things in relation to each other according to a particular sequence, pattern, or method. Arranged can be organized in a required sequence, pattern, or method.

During communications involving a namespace service, an access object service, and a deduplication services, a generation identifier is optionally identified which is associated with a first time of communicating by the namespace service, the access object service, or the deduplication service, block 626. The system can record the generation identifiers during the preliminary communications by instances of services. By way of example and without limitation, this can include the access object service 410 recording the generation identifier of 11 for the deduplication and compression service 414 when communicating the group of fingerprints numbered 1 to 509 to the deduplication and compression service 414. In another example, the access object service 410 records the generation identifier of 12 for the deduplication and compression service 416 when communicating as additional group of fingerprints to the deduplication and compression service 416. A generation identifier can be a sequence of characters used to refer to an entity in a sequence. A time can be a clearly identified chronological point as measured in hours and minutes, such as past midnight or noon.

After recording the generation identifiers during the preliminary communications by instances of services, a generation identifier is optionally identified which is associated with a second time of communicating by the namespace service, the access object service, or the deduplication service, block 628. The system can record the generation identifiers during the subsequent communications by instances of services. In embodiments, this can include the access object service 410 recording the generation identifier of 11 for the deduplication and compression service 414 when communicating the file segments numbered 2-7, 11-13, and 17-19 for the file named Green, compressed into compression regions, to the deduplication and compression service 414. In another example, the access object service 410 records the generation identifier of 12 for the deduplication and compression service 416 when communicating additional file segments, compressed into compression regions, to the deduplication and compression service 416. In an alternative example, the access object service 410 records the generation identifier of 13 for the deduplication and compression service 414 when communicating the file segments numbered 2-7, 11-13, and 17-19 for the file named Green, compressed into compression regions, to the deduplication and compression service 414.

If the generation identifier associated with the first time differs from the generation identifier associated with the second time, the namespace service, the access object service, or the deduplication service optionally restarts at least one communication, block 630. The system can restart at least part of the file copying process for service instances which changed their generation identifier during the process of copying a file. For example, and without limitation, this can include the access object service 410 determining that the deduplication and compression service 416 continued running during the copying of the file named Green because the generation identifier of 12 for the deduplication and compression service 416 remained unchanged from the first to the last communication with the deduplication and compression service 416. Therefore, the services orchestration environment 402 safely commits the data file's segments and fingerprints. A communication can be a conveying of information.

In an alternative example, the access object service 410 determines that the deduplication and compression service 414 restarted during the copying of the file named Green because the generation identifier of 11 for the deduplication and compression service 414 changed to 13 from the first to the last communication with the deduplication and compression service 416. In another alternative example, the access object service 410 determines that the deduplication and compression service 416 restarted during the copying of the file named Green because the generation identifier of 12 for the deduplication and compression service 416 changed to 14 from the first to the last communication with the deduplication and compression service 416. Since a restart occurred during the copying of the data file in both alternative examples, some the data file's segments and/or fingerprints may have been lost, such that the services orchestration environment 402 follows an error recovery procedure to restart at least one communication.

Restarting at least one communication may be based on at least one checkpoint associated with at least one of a time of copying the file and an amount of the file copied, wherein communicating includes receiving a communication. For example, the services orchestration environment 402 restarts all communications for the copying file because the time when the deduplication and compression service 414 restarted and received the new generation identifier of 13 was less than 10 minutes after the copying of the file named Green began and corresponds to checkpoint which was created after the number of fingerprints received from the source correspond to less than 100 MB of data segments. In an alternative example, the services orchestration environment 402 resends only the last segments to the deduplication and compression service 414 because the time when the deduplication and compression service 414 restarted and received the new generation identifier of 13 was immediately before the deduplication and compression service 414 received the communication of the last segments. This time was also hours after the copying of the file named Green began and corresponds to a checkpoint which was created after the number of fingerprints received from the source correspond to more than 1,000 MB (1 GB), of data segments. A checkpoint can be snapshot of a procedure's state, so that procedures can restart from that point in case of a failure. An amount can be a quantity of something, especially the total of a thing in number, size, or extent.

Although FIG. 6A depicts the blocks 602-630 occurring in a specific order, the blocks 602-630 may occur in other orders. In other implementations, each of the blocks 602-630 may also be executed concurrently and/or in combination with other blocks and/or some blocks may be divided into a distinct set of blocks.

FIG. 6B is a flowchart 640 that illustrates an optional method for grouping fingerprints in a file that is being copied from a source to a destination, which enables generating a similarity group identifier for the group of fingerprints, with the method acts illustrated as flowchart blocks 642-652. During communication of a stream of fingerprints, sequential fingerprints associated with the stream of fingerprints are optionally grouped until an initial sequence of fingerprints is formed which has a size that is larger than a minimum size, block 642. The system can ensure that the aggregated size of the fingerprints which have been identified for a data object or data file meets the minimum size of a group of fingerprints for forming a L1 segment. For example, and without limitation, this can include the access object service 410 grouping the initial 250 fingerprints for 250 data segments of the copy of the database as the initial sequence of fingerprints for the current L1 segment because the size of the corresponding initial 250 data segments is 2 MB, which is the minimum size of a group of data segments for forming a L1 segment.

Consecutive fingerprints can be sequential bit strings which were mapped from larger data objects or data files, and which uniquely identify the larger data objects or data files. Any sequence of fingerprints can be consecutive portions of bit strings which were mapped from larger data objects or data files, and which uniquely identify the larger data objects or data files. A size can be a storage space magnitude. A minimum size can be a smallest storage space magnitude for a specific purpose.

Having identified an initial sequence of fingerprints, sequential fingerprints which are next after the initial sequence of fingerprints are optionally grouped until a next sequence of fingerprints is formed which combined with the initial sequence of fingerprints have a combined size that is larger than a maximum size, block 644. The system can group a data file or object's fingerprints until the combined size of the grouped fingerprints is larger than the maximum size for a group of fingerprints for forming a L1 segment. By way of example and without limitation, this can include the access object service 410 grouping the next 500 fingerprints which follow the initial 250 fingerprints in the copy of the database as the next sequence of 500 fingerprints for forming the current L1 segment, because the size of the corresponding 750 data segments is 6 MB, which is the maximum size for a group of data segments for forming a L1 segment. A combined size can be a collection of storage space magnitudes. A maximum size can be a largest storage space magnitude for a specific purpose.

While grouping consecutive fingerprints as the next sequence of fingerprints, a feature value is optionally determined for each fingerprint of the next sequence of fingerprints, block 646. The system can determine a feature value for each fingerprint in the next sequence of fingerprints by selecting a series of bits from each fingerprint as each feature value. In embodiments, this can include the access object service 410 identifying bytes 8 to 11 of the 20-byte SHA-1 hash fingerprints which the access object service 410 has already generated for these next 500 data segments. A value can be a numerical amount.

After the determination of a feature value for each fingerprint of the next sequence of fingerprints, a value is optionally selected from the feature values, and a fingerprint is optionally selected corresponding to the selected value, block 648. The system can identify the fingerprint that will be used to divide the sequence of fingerprints which for the current L1 segment from the sequence of fingerprints which form the subsequent L1 segment, which may be identified based on the maximal or minimal value of specific bytes of the 20-byte SHA-1 hash fingerprints. For example, and without limitation, this can include the access object service 410 selecting the maximal value of 4.289 billion from the bytes 8-11 of the 20-byte SHA-1 hash fingerprints for the fingerprints numbered 251 to 750, and then selecting the fingerprint number 509 which has the maximal value 4.289 billion for the bytes 8-11 of its 20-byte SHA-1 hash fingerprint. A selected value can be a chosen numerical amount of an attribute of something.

Following selection of a fingerprint, the next sequence of fingerprints is optionally divided at the selected fingerprint, which includes divisions into a part of an initial group of fingerprints and a part of a next group of fingerprints, block 650. The system can divide the fingerprints for forming the current L1 segment from the fingerprints for forming the subsequent L1 segment at the fingerprint which has the relative maximal (or minimal) value of specific bytes of its 20-byte SHA-1 hash fingerprint. By way of example and without limitation, this can include the access object service 410 dividing the next 500 fingerprints, which are numbered 251 to 750, at the fingerprint number 509, which results in the fingerprints numbered 251 to 509 being the ending part of the current L1 segment and the fingerprints numbered 510 to 750 being the beginning part of the fingerprints for forming the next L1 segment. A part can be a piece of something which combined with other pieces makes up the whole.

Having divided the next sequence of fingerprints to form a part of the initial group of fingerprints, the part of the initial group of fingerprints is optionally combined with the initial sequence of fingerprints as the initial group of fingerprints, block 652. The system can combine the ending and beginning parts of the initial group of fingerprints. In embodiments, this can include the access object service 410 combining the fingerprints numbered 1 to 250 with the fingerprints numbered 251 to 509, which results in the fingerprints numbered 1 to 509 being the fingerprints for forming the current L1 segment.

The access object service 410 can apply a mod operator to transform the selected alternative feature value to a similarity group identifier's value, such as the remainder of 483 after 4.147483 billion is divided by 1,000, or the remainder of 269 after 4.283269 billion is divided by 1,000. Then the method depicted by flowchart 640 may return to the block 608 of FIG. 6A which may have initiated execution of the blocks 642-652.

FIG. 6C is a flowchart 660 that illustrates an optional method for source file copying and error handling, with the method acts illustrated as flowchart blocks 662-688. A namespace service optionally receives a request to copy a namespace to a destination, block 662. The system can receive a request to copy a namespace to a destination. For example, and without limitation, this can include the namespace copying controller service 408 receiving a request to copy the Human Relations employees namespace 424 to a destination, which could be the services orchestration environment 444 or the Data Domain system 438.

After receiving a request to copy a namespace, a namespace service optionally identifies a namespace update for a file associated with the namespace, block 664. Identifying the namespace update for the file may include the namespace service determining a difference between a first snapshot of a namespace and a second snapshot of the namespace. The system can compare differences between snapshots of a namespace to identify a namespace update for at least one file. By way of example and without limitation, this can include the namespace copying controller service 408 calculating the differential of a current snapshot of the Human Relations employees namespace relative to a previous snapshot of the Human Relations employees namespace to identify an update to rename the employee file previously named Greene as the employee file named Green in the Human Relations employees namespace. A difference can be a way in which things are not the same. A snapshot can be a record of the contents of a storage location or data file at a given time.

Following the identification of the namespace update, a namespace service optionally communicates the namespace update for the file to the destination, block 666. The system can communicate a namespace update for a file to a destination. In embodiments, this can include the namespace copying controller service 408 communicating the namespace update for the file named Greene to the services orchestration environment 444 or the Data Domain system 438.

A request is optionally received to copy a file to a destination, block 668. The system may be the source of a file to be copied. For example, and without limitation, this can include the access object service 410 receiving a request to copy the file named Greene from the source services orchestration environment 402 to the destination services orchestration environment 444. A destination can be a target for where a file is sent.

The namespace copying controller service 408 can use the mapping of a load balancer, which would have used identifiers of files to select previous access object services, to select which of the current access object services will identify a similarity group identifier for a group of fingerprints which were created for a file that is requested to be copied to a destination. For example, the namespace copying controller service 408 uses the mapping of the custom load balancer 406 which previously hashed the name of the file named Greene to the access object service 410 to identify a similarity group identifier for a previous group of fingerprints for a previous file that was requested to be copied to the destination services orchestration environment 444, to identify the mapping value to route the current request to the access object service 410, instead of to the access object service 412.

After receiving a request to copy a file to a destination, an access object service optionally identifies a similarity group identifier for a group of fingerprints corresponding to sequential segments in the file that was requested to be copied, block 670. The system can identify an existing similarity group identifier for an existing group of fingerprints for the file requested to be copied. By way of example and without limitation, this can include the access object service 410 using the name of the file named Greene which is requested to be copied and the named file's metadata to identify an existing similarity group identifier of 483 which the Data Domain system 438 or the services orchestration environment 402 had already created for a group of fingerprints numbered 1 to 509 in the database file named Greene which is requested to be copied. The existing similarity group identifier and the existing group of fingerprints may have been created either before or when the database file was copied to the services orchestration environment 402.

The Data Domain system 438 or the services orchestration environment 402 can execute the blocks 642-652, as described above and depicted by FIG. 6B, to generate a group of fingerprints for the database file to be copied from the source services orchestration environment 402 to the destination services orchestration environment 444. The Data Domain system 438 or the services orchestration environment 402 can also execute the block 610, as described above and depicted by FIG. 6A, to generate a similarity group identifier for the group of fingerprints. Sequential segments can be consecutive parts into which a file is divided.

Following the identification of a similarity group identifier for a group of fingerprints an access object service optionally communicates a request for the group of fingerprints to a deduplication service which is associated with a range of similarity group identifiers that include the similarity group identifier, block 672. The system can request the appropriate service to provide the group of fingerprints. In embodiments, this can include the access object service 410 using the similarity group identifier of 483 to request the fingerprints for the group of fingerprints numbered 1 to 509 for the file named Greene from the deduplication and compression service 414, which supports groups of segments with similarity group identifiers in the range of 0 to 500.

Having retrieved the requested group of fingerprints from fingerprint storage, a deduplication service optionally communicates the group of fingerprints to an access object service, block 674. The system can retrieve a group of fingerprints for the file to be copied to the destination. For example, and without limitation, this can include the deduplication and compression service 414 retrieving the group of fingerprints numbered 1 to 509 for the file named Greene from the underlying shared storage system 430, and then communicating the group of fingerprints numbered 1 to 509 to the access object service 410.

After receiving a communication of the requested group of fingerprints, an access object service optionally communicates the group of fingerprints and its similarity group identifier to a destination, block 676. The system can communicate a group of fingerprints for the file being copied to the destination, along with a similarity group identifier to enable the destination to efficiently process the group of the fingerprints. By way of example and without limitation, this can include the access object service 410 communicating the group of fingerprints numbered 1 to 509 414 retrieving the group of fingerprints numbered 1 to 509 for the file named Greene and the similarity group identifier of 483 to the destination services orchestration environment 444.

Following receipt from a destination of a request for segments of the file, which correspond to fingerprints missing in the destination, an access object service optionally communicates the request to a deduplication service, block 678. The system can forward the request for segments missing from the destination to the service which can retrieve the missing segments. In embodiments, this can include the access object service 410 receiving a communication of a request from the destination services orchestration environment 444 for file segments numbered 2-7, 11-13, and 17-19 for the file named Greene because fingerprints numbered 2-7, 11-13, and 17-19 are missing in the destination services orchestration environment 444, and then communicating the request to the deduplication and compression service 414.

Having retrieved the requested segments from a source storage, a deduplication service optionally communicates the requested segments to an access object service, block 680. The system can retrieve, compress, and communicate file segments which were identified as missing from the destination. For example, and without limitation, this can include the deduplication and compression service 414 retrieving the requested file segments numbered 2-7, 11-13, and 17-19 for the file named Greene from the underlying shared storage system 430, compressing these requested file segments into compression regions, and communicating these compression regions to the access object service 410. A source storage can be recording media which retains digital information and is associated with from where a file originates.

Following receipt of requested segments of the file, the access object service optionally communicates the requested segments to the destination, thereby enabling the destination to store the namespace update for the file in a namespace data structure block 682. The system can communicate a file's segments, which were identified as missing from the destination, to the destination, which enables the destination to update its namespace for the file. By way of example and without limitation, this can include the access object service 410 communicating the compression regions which include the file segments numbered 2-7, 11-13, and 17-19 for the file named Green to the destination services orchestration environment 444, which records the requested segments into a log, uses a packer service to form a container that includes the requested segments, and then stores the container into a destination storage, such as the destination shared storage system 446. In this example, storing these file segments for the file named Green enables the destination services orchestration environment 444 to store the namespace update for renaming the file previously named Greene in the destination's Human Relations employees namespace in the destination shared storage system 446. A log can be recording media that retains digital information.

During communications involving a namespace service, an access object service, and a deduplication services, a generation identifier is optionally identified which is associated with a first time of communicating by the access object service or the deduplication service, block 684. The system can record the generation identifiers during the preliminary communications by instances of services. In embodiments, this can include the access object service 410 recording the generation identifier of 11 for the deduplication and compression service 414 when requesting the group of fingerprints numbered 1 to 509 for the file named Green from the deduplication and compression service 414. In another example, the access object service 410 records the generation identifier of 12 for the deduplication and compression service 416 when requesting an additional group of fingerprints from the deduplication and compression service 416.

After recording the generation identifiers during the preliminary communications by instances of services, a generation identifier is optionally identified which is associated with a second time of communicating by the namespace service, the access object service, or the deduplication service, block 686. The system can record the generation identifiers during the subsequent communications by instances of services. For example, and without limitation, this can include the access object service 410 recording the generation identifier of 11 for the deduplication and compression service 414 when receiving s communication of the file segments numbered 2-7, 11-13, and 17-19 for the file named Green, compressed into compression regions, from the deduplication and compression service 414. In another example, the access object service 410 records the generation identifier of 12 for the deduplication and compression service 416 when receiving a communication of additional file segments, compressed into compression regions, from the deduplication and compression service 416. In an alternative example, the access object service 410 records the generation identifier of 13 for the deduplication and compression service 414 when receiving a communication of the file segments numbered 2-7, 11-13, and 17-19 for the file named Green, compressed into compression regions, from the deduplication and compression service 414.

If the generation identifier associated with the first time differs from the generation identifier associated with the second time, the namespace service, the access object service, or the deduplication service optionally restarts at least one communication, block 688. The system can restart at least part of the file copying process for service instances which changed their generation identifier during the process of copying a file. By way of example and without limitation, this can include the access object service 410 determining that the deduplication and compression service 416 continued running during the copying of the file named Green because the generation identifier of 12 for the deduplication and compression service 416 remained unchanged from the first to the last communication with the deduplication and compression service 416. Therefore, the services orchestration environment 402 safely commits the record of copying the data file to the destination.

In an alternative example, the access object service 410 determines that the deduplication and compression service 414 restarted during the copying of the file named Green because the generation identifier of 11 for the deduplication and compression service 414 changed to 13 from the first to the last communication with the deduplication and compression service 414. In another alternative example, the access object service 410 determines that the deduplication and compression service 416 restarted during the copying of the file named Green because the generation identifier of 12 for the deduplication and compression service 416 changed to 14 from the first to the last communication with the deduplication and compression service 416. Since a restart occurred during both alternative examples of the copying of the file named Green, some the data file's segments and/or fingerprints may have been lost, such that the services orchestration environment 402 follows an error recovery procedure to restart at least one communication.

Restarting at least one communication may be based on at least one checkpoint associated with at least one of a time of copying the file and an amount of the file copied, wherein communicating includes receiving a communication. For example, the services orchestration environment 402 restarts all communications for the copying of the file named Green because the time when the deduplication and compression service 414 restarted and received the new generation identifier of 13 was less than 10 minutes after the copying of the file named Green began and corresponds to checkpoint which was created after the number of fingerprints sent to the destination correspond to less than 100 MB of data segments. In an alternative example, the services orchestration environment 402 resends only the last segments from the deduplication and compression service 414 because the time when the deduplication and compression service 414 restarted and received the new generation identifier of 13 was immediately before the deduplication and compression service 414 sent the last segments. This time was also hours after the copying of the file named Green began and corresponds to checkpoint which was created after the number of fingerprints sent to the destination correspond to more than 1,000 MB (1 GB), of data segments.

Although FIG. 6C depicts the blocks 662-688 occurring in a specific order, the blocks 662-688 may occur in other orders. In other implementations, each of the blocks 662-688 may also be executed concurrently and/or in combination with other blocks and/or some blocks may be divided into a distinct set of blocks.

Exemplary Computing System

Figure 7:
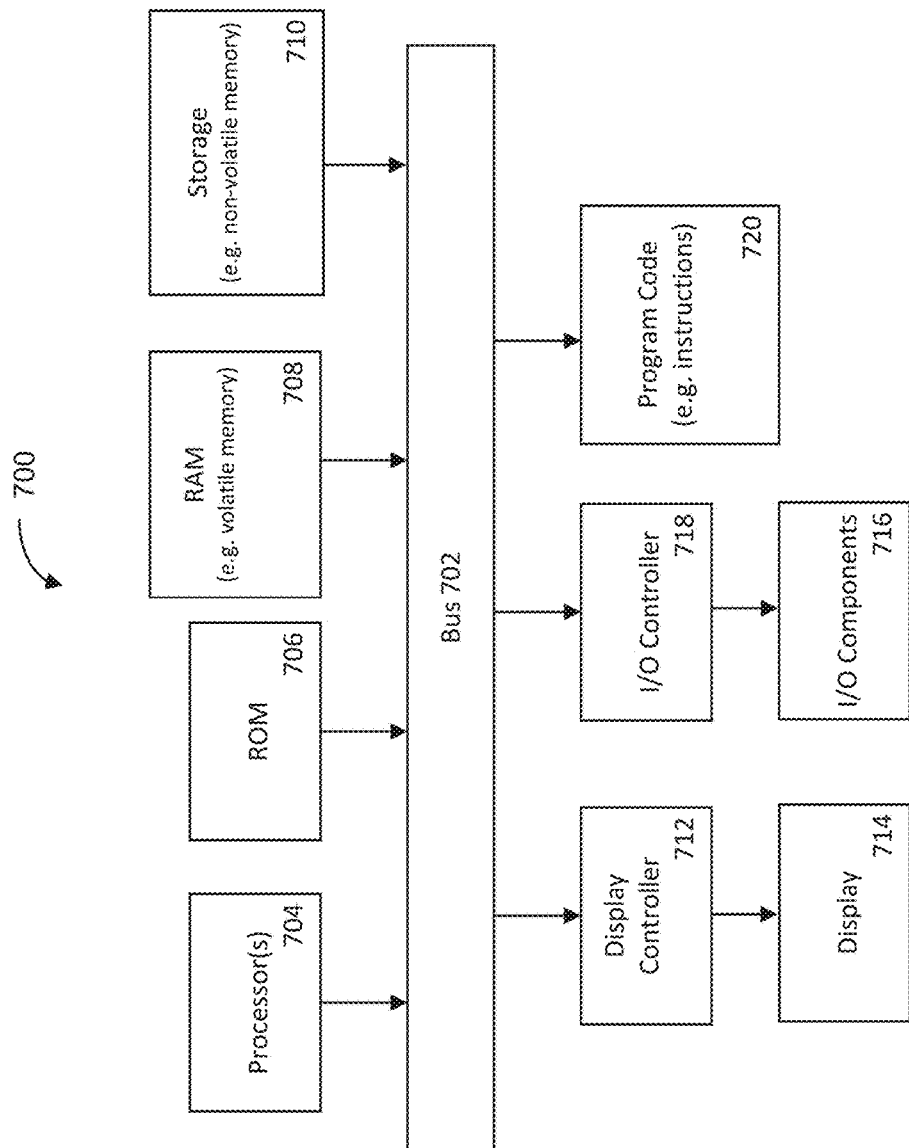
FIG. 7 is a block diagram illustrating a computing system for namespace and file copying according to one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 702 which may be coupled to a processor 704, ROM (Read Only Memory) 706, RAM (or volatile memory) 708, and storage (or non-volatile memory) 710. The processor(s) 704 may retrieve stored instructions from one or more of the memories 706, 708, and 710 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 704 may perform operations in an on-demand or "cloud computing" environment or as a service, such as within a "software as a service" (SaaS) implementation. Accordingly, the performance of operations may be distributed among the one or more processors 704, whether residing only within a single machine or deployed across a number of machines. For example, the one or more processors 704 may be located in a single geographic location (such as within a home environment, an office environment, or a server farm), or may be distributed across a number of geographic locations.

The RAM 708 may be implemented as, for example, dynamic RAM (DRAM), or other types of memory that require power continually in order to refresh or maintain the data in the memory. Storage 710 may include, for example, magnetic, semiconductor, tape, optical, removable, non-removable, and other types of storage that maintain data even after power is removed from the system. It should be appreciated that storage 710 may be remote from the system, such as accessible via a network.

A display controller 712 may be coupled to the bus 702 in order to receive display data to be displayed on a display device 714, which can display any one of the user interface features or embodiments described herein and may be a local or a remote display device. The computing system 700 may also include one or more input/output (I/O) components 716 including mice, keyboards, touch screen, network interfaces, printers, speakers, and other devices. Typically, the input/output components 716 are coupled to the system through an input/output controller 718.

Program code 720 may represent any of the instructions, applications, software, libraries, toolkits, modules, components, engines, units, functions, logic, etc. as described herein. Program code 720 may reside, completely or at least partially, within the memories described herein (such as non-transitory computer-readable media), or within a processor during execution thereof by the computing system. Program code 720 may include both machine code, such as produced by a compiler, and files containing higher-level or intermediate code that may be executed by a computing system or other data processing apparatus (or machine) using an interpreter. In addition, program code 720 may be implemented as software, firmware, or functional circuitry within the computing system, or as combinations thereof. Program code 720 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for destination namespace and file copying comprising:
    one or more processors; and
    a non-transitory computer readable medium storing a plurality of instructions, which when executed, cause the one or more processors to:
    communicate, by a namespace service, a namespace update for a file to an access object service identified for the file, in response to receiving a communication of the namespace update for the file from a source of the file;
    identify, by the access object service, sequential fingerprints in a stream of fingerprints as a group of fingerprints, in response to receiving a communication of the stream of fingerprints which correspond to segments of the file, and which are from the source of the file;
    identify, by the access object service, a similarity group identifier for the group of fingerprints;
    communicate, by the access object service, the group of fingerprints to a deduplication service associated with a range of similarity group identifiers that include the similarity group identifier;
    identify, by the deduplication service, fingerprints in the group of fingerprints that are missing from fingerprint storage;
    communicate, by the deduplication service, the identified fingerprints to the access object service;
    communicate, by the access object service to the source of the file, a request for segments of the file corresponding to the identified fingerprints;
    receive, by the deduplication service, a communication of the requested segments from the source of the file;
    store, by the deduplication service, the requested segments; and
    store, by the access object service, the namespace update for the file in a distributed namespace data structure.

2. The system of claim 1, wherein identifying the access object service for the file comprises the namespace service using one of any identifier of the file and a mapping created by a load balancer that used identifiers of files to identify access object services, to identify the access object service from a plurality of access object services.

3. The system of claim 1, wherein an order in which namespace updates for files are stored in the distributed namespace data structure corresponds to an order in which the files are arranged in a namespace data structure in the source of the file.

4. The system of claim 1, wherein the plurality of instructions further causes the processor to:
    identify by one of the namespace service, the access object service, and the deduplication service, a generation identifier associated with a first time of communicating;
    identify by the one of the namespace service, the access object service, and the deduplication service, a generation identifier associated with a second time of communicating; and
    restart at least one communication by the one of the namespace service, the access object service, and the deduplication service, in response to a determination that the generation identifiers associated with the first and second times differ.

5. The system of claim 4, wherein restarting at least one communication is based on at least one checkpoint associated with at least one of a time of copying the file and an amount of the file copied, wherein communicating includes receiving a communication.

6. The system of claim 1, wherein the access object service receiving the communication of the stream of fingerprints, which correspond to segments of the file, comprises the namespace service using a mapping created by a load balancer that used identifiers of files to select access object services for receiving communications of streams of fingerprints, to select the access object service, of a plurality of access object services, for receiving the communication of the stream of fingerprints.

7. The system of claim 1, wherein receiving the communication of the requested segments comprises receiving the communication of the requested segments in a compressed format, the deduplication service receiving the communication of the requested segments from the source comprises the namespace service communicating the requested segments communicated from the source via the access object service to the deduplication service, and storing the requested segments comprises storing the identified fingerprints into the fingerprint storage, and a packer service forming at least one container comprising the requested segments and then storing the at least one container into a destination storage.

8. A computer program product comprising a non-transitory computer-readable medium having a computer-readable program code embodied therein to be executed by one or more processors, the program code including instructions to:

communicate, by a namespace service, a namespace update for a file to an access object service identified for the file, in response to receiving a communication of the namespace update for the file from a source of the file;

identify, by the access object service, sequential fingerprints in a stream of fingerprints as a group of fingerprints, in response to receiving a communication of the stream of fingerprints which correspond to segments of the file, and which are from the source of the file;

identify, by the access object service, a similarity group identifier for the group of fingerprints;

communicate, by the access object service, the group of fingerprints to a deduplication service associated with a range of similarity group identifiers that include the similarity group identifier;

identify, by the deduplication service, fingerprints in the group of fingerprints that are missing from fingerprint storage;

communicate, by the deduplication service, the identified fingerprints to the access object service;

communicate, by the access object service to the source of the file, a request for segments of the file corresponding to the identified fingerprints;

receive, by the deduplication service, a communication of the requested segments from the source of the file;

store, by the deduplication service, the requested segments; and store, by the access object service, the namespace update for the file in a distributed namespace data structure.

9. The computer program product of claim 8, wherein identifying the access object service for the file comprises the namespace service using one of any identifier of the file and a mapping created by a load balancer that used identifiers of files to identify access object services, to identify the access object service from a plurality of access object services.

10. The computer program product of claim 8, wherein an order in which namespace updates for files are stored in the distributed namespace data structure corresponds to an order in which the files are arranged in a namespace data structure in the source of the file.

11. The computer program product of claim 8, wherein the program code includes further instructions to:

identify by one of the namespace service, the access object service, and the deduplication service, a generation identifier associated with a first time of communicating;

identify by the one of the namespace service, the access object service, and the deduplication service, a generation identifier associated with a second time of communicating; and restart at least one communication by the one of the namespace service, the access object service, and the deduplication service, in response to a determination that the generation identifiers at the first and second times differ.

12. The computer program product of claim 11, wherein restarting at least one communication is based on at least one checkpoint associated with at least one of a time of copying the file and an amount of the file copied, wherein communicating includes receiving a communication.

13. The computer program product of claim 8, wherein the access object service receiving the communication of the stream of fingerprints, which correspond to segments of the file, comprises the namespace service using a mapping created by a load balancer that used identifiers of files to select access object services for receiving communications of streams of fingerprints, to select the access object service, of a plurality of access object services, for receiving the communication of the stream of fingerprints.

14. The computer program product of claim 8, wherein receiving the communication of the requested segments comprises receiving the communication of the requested segments in a compressed format, the deduplication service receiving the communication of the requested segments from the source comprises the namespace service communicating the requested segments communicated from the source via the access object service to the deduplication service, and storing the requested segments comprises storing the identified fingerprints into the fingerprint storage, and a packer service forming at least one container comprising the requested segments and then storing the at least one container into a destination storage.

15. A computer-implemented method for destination file copying and error handling comprising:

communicating, by a namespace service, a namespace update for a file to an access object service identified for the file, in response to receiving a communication of the namespace update for the file from a source of the file;

identifying, by the access object service, sequential fingerprints in a stream of fingerprints as a group of fingerprints, in response to receiving a communication of the stream of fingerprints which correspond to segments of the file, and which are from the source of the file;

identifying, by the access object service, a similarity group identifier for the group of fingerprints;

communicating, by the access object service, the group of fingerprints to a deduplication service associated with a range of similarity group identifiers that include the similarity group identifier;

identifying, by the deduplication service, fingerprints in the group of fingerprints that are missing from fingerprint storage;

communicating, by the deduplication service, the identified fingerprints to the access object service;

communicating, by the access object service to the source of the file, a request for segments of the file corresponding to the identified fingerprints;

receiving, by the deduplication service, a communication of the requested segments from the source of the file;

storing, by the deduplication service, the requested segments; and storing, by the access object service, the namespace update for the file in a distributed namespace data structure.

16. The computer-implemented method of claim 15, wherein identifying the access object service for the file comprises the namespace service using one of any identifier of the file and a mapping created by a load balancer that used identifiers of files to identify access object services, to identify the access object service from a plurality of access object services.

17. The computer-implemented method of claim 15, wherein an order in which namespace updates for files are stored in the distributed namespace data structure corresponds to an order in which the files are arranged in a namespace data structure in the source of the file.

18. The computer-implemented method of claim 15, wherein the computer-implemented method further comprises:
- identifying by one of the namespace service, the access object service, and the deduplication service, a generation identifier associated with a first time of communicating;
- identifying by the one of the namespace service, the access object service, and the deduplication service, a generation identifier associated with a second time of communicating; and
- restarting at least one communication by the one of the namespace service, the access object service, and the deduplication service, in response to a determination that the generation identifiers at the first and second times differ.

19. The computer-implemented method of claim 18, wherein restarting at least one communication is based on at least one checkpoint associated with at least one of a time of copying the file and an amount of the file copied, wherein communicating includes receiving a communication.

20. The computer-implemented method of claim 15, wherein the access object service receiving the communication of the stream of fingerprints, which correspond to segments of the file, comprises the namespace service using a mapping created by a load balancer that used identifiers of files to select access object services for receiving communications of streams of fingerprints, to select the access object service, of a plurality of access object services, for receiving the communication of the stream of fingerprints.

* * * * *